United States Patent [19]

Taguchi et al.

[11] Patent Number: 5,796,693
[45] Date of Patent: Aug. 18, 1998

[54] DATA REPRODUCTION APPARATUS AND DATA REPRODUCTION METHOD

[75] Inventors: Masakazu Taguchi; Michio Matsuura; Yoshihide Fujita; Akihiro Itakura, all of Kawasaki, Japan

[73] Assignee: Fujitsu Limited, Kawasaki, Japan

[21] Appl. No.: 781,280

[22] Filed: Jan. 10, 1997

[30] Foreign Application Priority Data

Sep. 17, 1996 [JP] Japan .................... 8-245288

[51] Int. Cl.$^6$ .................................... G11B 7/00
[52] U.S. Cl. ........................ 369/59; 369/47; 369/124
[58] Field of Search ........................ 369/59, 58, 42, 369/48, 49, 50, 54, 32, 124; 360/48, 51, 39

[56] References Cited

U.S. PATENT DOCUMENTS 5,598,392  1/1997  Izumi et al. .................... 369/124 X

FOREIGN PATENT DOCUMENTS

| 61-214278 | 9/1986 | Japan . |
| 5290437 | 11/1993 | Japan . |
| 887828 | 4/1994 | Japan . |
| 6267200 | 9/1994 | Japan . |

OTHER PUBLICATIONS

Technical Report of IEICE—MR95–66; Hideki Sawaguchi et al.; "Performance Comparison of Signal Processing System for High–Density Digital Magnetic Recording Channels".

Technical Report of IEICE—MR95–74; Takeshi Nakamura et al.; "A Study of PRML Systems for a Phase Change Optical Disk".

*Primary Examiner*—Muhammad N. Edun
*Attorney, Agent, or Firm*—Greer, Burns & Crain, Ltd.

[57] ABSTRACT

A data reproduction apparatus of an optical disk having a maximum likelihood detection system for compensating a stationary edge shift and an edge shift depending on record pattern at the time of reproduction. The edge shift that has not completely been compensated at the time of recording in an optical disk is compensated by controlling an expected value in branch metric calculation of maximum likelihood detection while recognizing the pattern of record data at the time of reproduction. The edge shift amount is measured on the basis of the reproduction signal relative to the VFO area of the optical disk, and an expected value compensation table for showing an optimum expected value in branch metric calculation is selected preliminarily according to the measured amount. Thereby, the pattern of record data in the data area of the optical disk is recognized, the optimum expected value according to the recognized pattern of record data is determined by referring to the selected expected value compensation table, and the branch metric calculation is operated by using the optimum expected value.

15 Claims, 23 Drawing Sheets

FIG. 6

3 VALUE 4 STATE PR(1,1)

| TIME<br>STATE | t-2 | t-1 | t | | EXPECTED<br>VALUE Ph |
|---|---|---|---|---|---|
| S0 | 0 | 0 | 0 | S0 | $P_0 = 0$ |
| S1 | 1 | 0 | 0 | S0 | $P_1 = 0$ |
| ~~S2~~ | ~~0~~ | ~~1~~ | ~~0~~ | ~~S1~~ | |
| S3 | 1 | 1 | 0 | S1 | $P_3 = 1$ |
| S0 | 0 | 0 | 1 | S2 | $P_4 = 1$ |
| ~~S1~~ | ~~1~~ | ~~0~~ | ~~1~~ | ~~S2~~ | |
| S2 | 0 | 1 | 1 | S3 | $P_6 = 2$ |
| S3 | 1 | 1 | 1 | S3 | $P_7 = 2$ |

DATA VALUE at/EXPECTED VALUE Ph

FIG. 12

| TABLEn | 2T MARK | 3T MARK | 4T MARK | 5T MARK | 6T MARK | 7T MARK | 8T MARK |
|---|---|---|---|---|---|---|---|
| 2T SPACE | -17.5 | -22.5 | -25.8 | -27.8 | -29.0 | -30.0 | -30.8 |
| 3T SPACE | -10.0 | -15.0 | -18.2 | -20.2 | -21.5 | -22.5 | -23.2 |
| 4T SPACE | -6.2 | -11.2 | -14.5 | -16.5 | -17.8 | -18.8 | -19.5 |
| 5T SPACE | -3.8 | -8.8 | -12.0 | -14.0 | -15.2 | -16.2 | -17.0 |
| 6T SPACE | -2.0 | -7.0 | -10.2 | -12.2 | -13.5 | -14.5 | -15.2 |
| 7T SPACE | -1.5 | -6.5 | -9.8 | -11.8 | -13.0 | -14.0 | -14.8 |
| 8T SPACE | -1.0 | -6.0 | -9.2 | -11.2 | -12.5 | -13.5 | -14.2 |

(UNIT:%)

TABLE-n
TABLE0
TABLEn

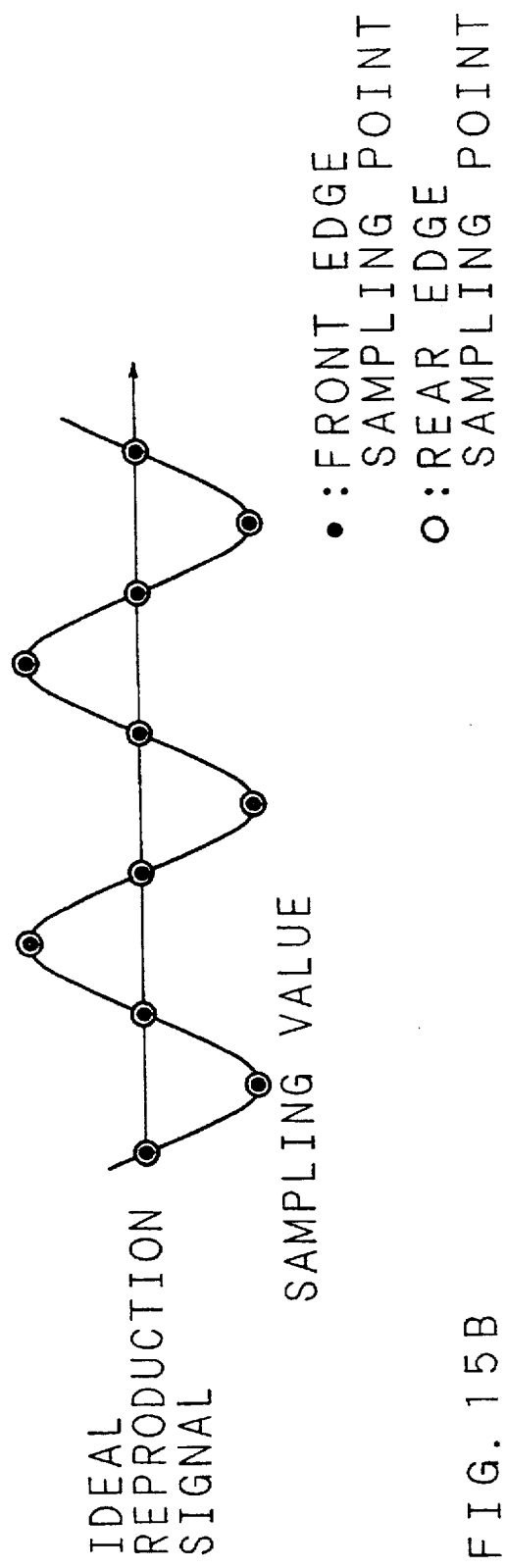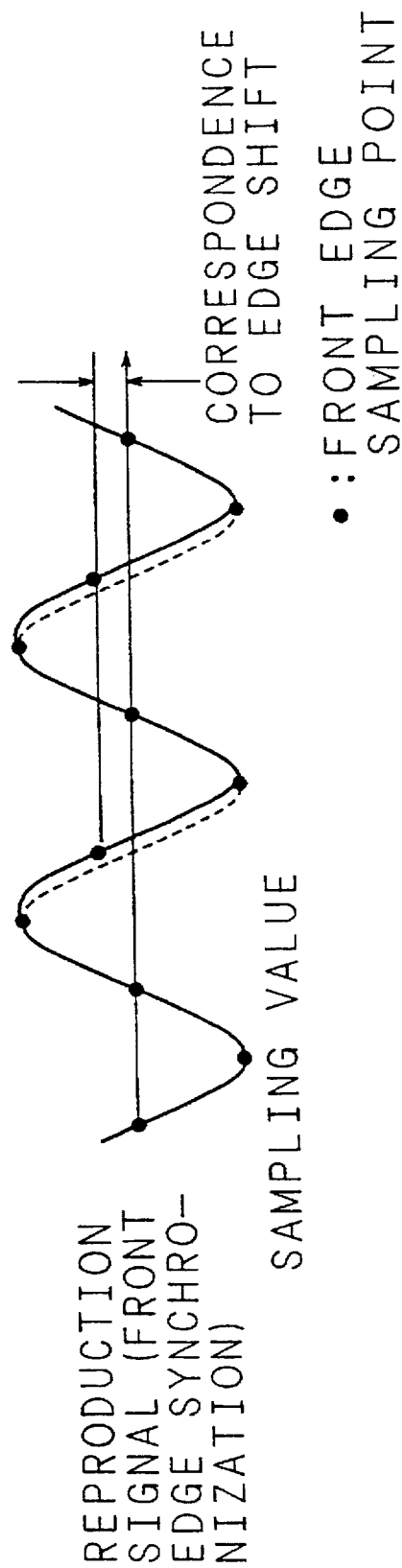

NO EDGE SHIFT

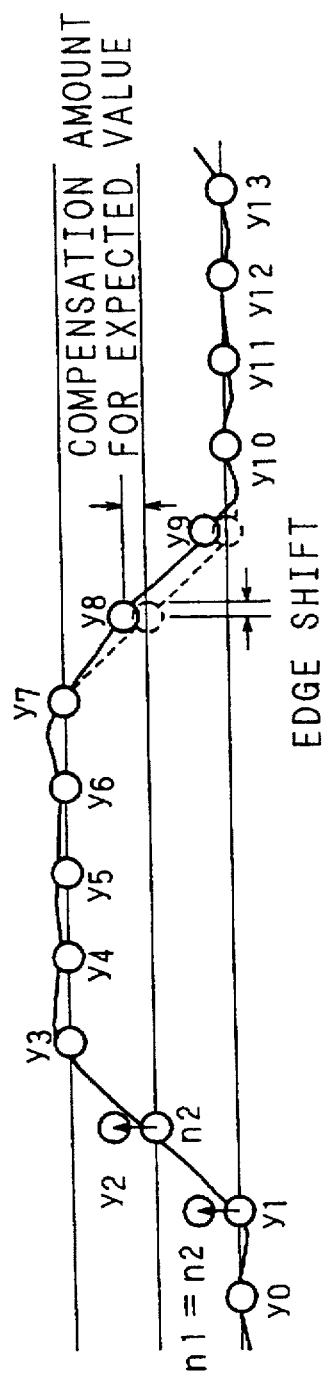
FIG. 20A
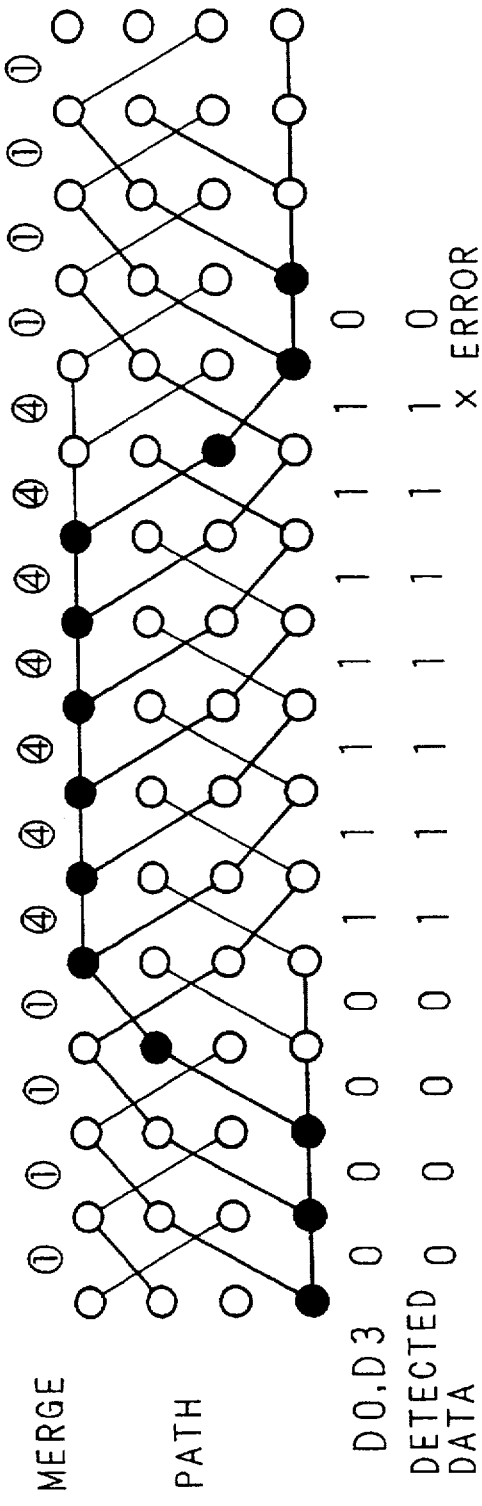
FIG. 20B 60% EDGE SHIFT (NO COMPENSATION)

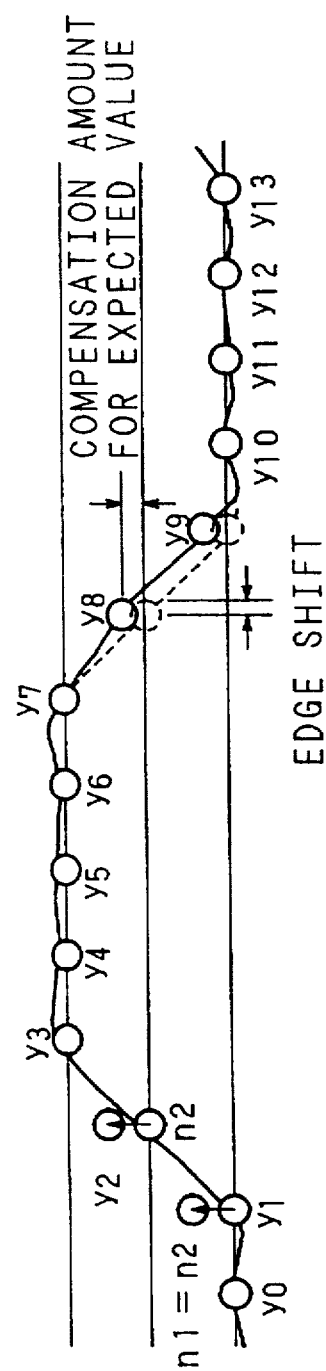
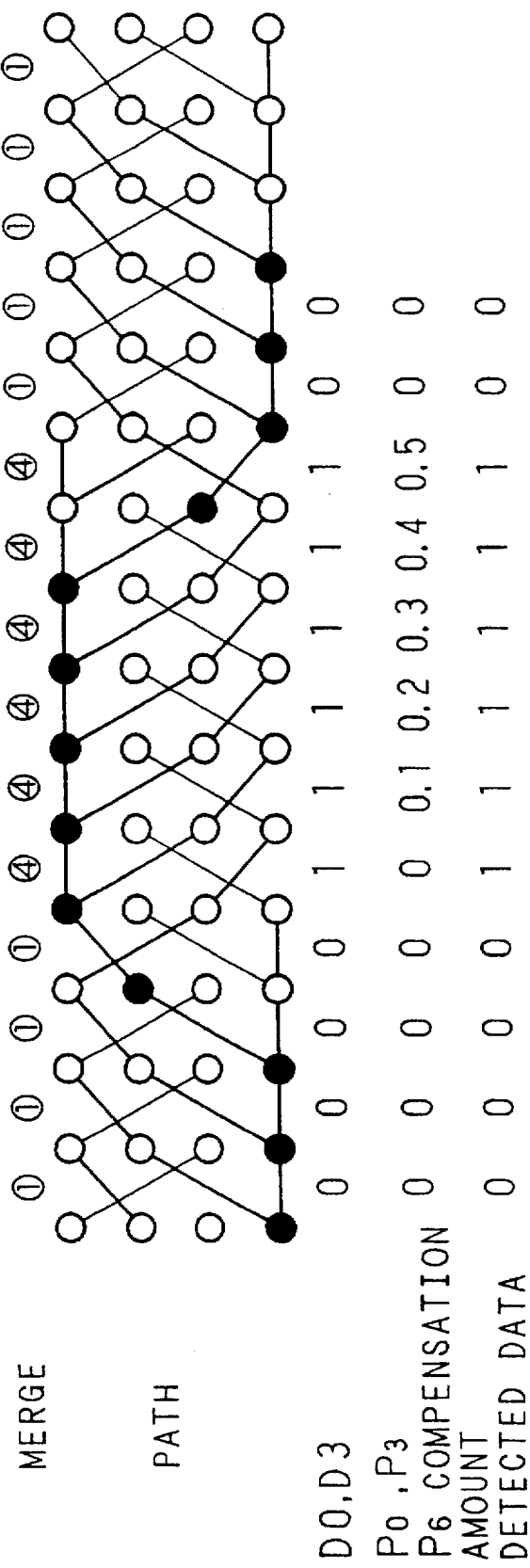
FIG. 21A
FIG. 21B +60% EDGE SHIFT (COMPENSATION)

FIG. 23A

RELATION BETWEEN PATH MEMORY
AND MARK LENGTH RECOGNITION

| M2 | M3 | M4 | M5 | M6 | M7 | M8 |   | Z OUTPUT |
|----|----|----|----|----|----|----|---|----------|
| 1  | 0  | 0  | 0  | 0  | 0  | 0  | 2T MARK | 1000 |
| 1  | 1  | 0  | 0  | 0  | 0  | 0  | 3T MARK | 1001 |
| 1  | 1  | 1  | 0  | 0  | 0  | 0  | 4T MARK | 1010 |
| 1  | 1  | 1  | 1  | 0  | 0  | 0  | 5T MARK | 1011 |
| 1  | 1  | 1  | 1  | 1  | 0  | 0  | 6T MARK | 1100 |
| 1  | 1  | 1  | 1  | 1  | 1  | 0  | 7T MARK | 1101 |
| 1  | 1  | 1  | 1  | 1  | 1  | 1  | 8T MARK | 1110 |

FIG. 23B

RELATION BETWEEN PATH MEMORY
AND SPACE LENGTH RECOGNITION

| S2 | S3 | S4 | S5 | S6 | S7 | S8 |   | Y OUTPUT |
|----|----|----|----|----|----|----|---|----------|
| 1  | 0  | 0  | 0  | 0  | 0  | 0  | 2T SPACE | 0000 |
| 1  | 1  | 0  | 0  | 0  | 0  | 0  | 3T SPACE | 0001 |
| 1  | 1  | 1  | 0  | 0  | 0  | 0  | 4T SPACE | 0010 |
| 1  | 1  | 1  | 1  | 0  | 0  | 0  | 5T SPACE | 0011 |
| 1  | 1  | 1  | 1  | 1  | 0  | 0  | 6T SPACE | 0100 |
| 1  | 1  | 1  | 1  | 1  | 1  | 0  | 7T SPACE | 0101 |
| 1  | 1  | 1  | 1  | 1  | 1  | 1  | 8T SPACE | 0110 |

1

DATA REPRODUCTION APPARATUS AND DATA REPRODUCTION METHOD

BACKGROUND OF THE INVENTION

The present invention relates to an apparatus and a method for reproducing data stored in an optical disk.

Recent accelerating development of multi-media is spotlighting the utility of optical disks as external storage media, and in line with an increase in the amount of record data, each disk is required to have a large storage capacity. The recording system in an optical disk employs a pit-position recording system where a record data corresponds to the center of a written-in record pit and an edge-position recording system where a record data corresponds to both edges of the record pit. The edge-position recording system is advantageous in that the storage density can be increased in the direction of track about 1.5 times as compared with the pit-position recording system. The pit-position recording system is worth notice as a recording system which can increase the storage capacity, that is, the storage density.

FIGS. 1A and 1B show the relationship between the record data and the record pit formed on a track of an optical disk in the pit-position system and in the edge-position system, respectively. FIG. 1(a) shows an example of the pit-position system, and FIG. 1(b) shows an example of the edge-position system. A record pit is formed at a place where a laser diode is lit in controlling lighting and extinguishing in accordance with a record data.

A re-write permit optical disk adopts a thermal record system, and the length of a record pit varies with environmental temperatures and record powers. This variation in length is called an "edge shift". More specifically, as shown in FIG. 1, when an environmental temperature is higher than an optimum temperature at the time of recording, the record pit becomes long. An edge shift does not seriously affect the pit-position recording system, but is likely to decrease the phase margin in reproducing data, thereby causing an erroneous data production. For example, when the environmental temperature is extraordinary high at the time of recording, the length of a record pit is prolonged. If a front edge (ascending edge) and a rear edge (descending edge) are alternately detected, it is found that the detected rear edge is slightly behind an ideal rear edge position. This causes an error.

In order to solve the problem occurring in reproducing data under the edge-position recording system, a system for independently detecting a front edge and a rear edge is proposed, which is disclosed in Japanese Patent Application Laid-Open No. 61-214278. This independent detection system is based, in theory, on the fact that a front edge and rear edge of a reproduction waveform have the same form (i.e. function), and in practice, detects signals representing a front edge and rear edge of a particular reproduction waveform independently. As a result, a timing clock is generated from each of the signals, and data is reproduced in accordance with each timing clock.

Referring to FIG. 2, a device used to perform the independent detection system will be more particularly described:

The system includes an optical disk 61 under which an optical head 62 is provided to obtain a reproduction signal which represents a record data in the optical disk 61. The optical head 62 outputs the reproduction signal to an amplifier 63 which amplifies it and outputs the amplified reproduction signal to a waveform equalizer 64. The waveform equalizer 64 shapes the waveform of the amplified reproduction signal, and delivers it to an edge detector 65. The edge detector 65 independently detects a front edge and a rear edge from the shaped reproduction signal, and outputs the detected front edge data to a discriminator 66a and a PLL circuit 67a, and outputs the detected rear edge data to a discriminator 66b and a PLL circuit 67b.

Each PLL circuit 67a and 67b generates a series of clock representing an ascending timing and a descending timing, and outputs them to the discriminators 66a and 66b, respectively. The discriminator 66a discriminates data at the timing of a clock synchronizing with the front edge reproduced in the PLL circuit 67a, and the discriminator 66b discriminates data at the timing of a clock synchronizing with the rear edge reproduced in the PLL circuit 67b. The discriminated data and clock are outputted to a synthesizer 68 which synthesizes them and outputs a synthesized signal to a demodulator 69. The demodulator 69 demodulates a final data from a data string to be inputted.

The operation will be described:

A reproduction signal obtained by the optical head 62 from the optical disk 61 is delivered to the edge detector 65 through the amplifier 63 and the waveform equalizer 64. The edge detector 65 independently detects a front edge and a rear edge by a two-stage differential method or a slice method. The detected front edge data is discriminated by the discriminator 66a by a clock synchronizing with the front edge from the PLL circuit 67a. The detected rear edge data is discriminated by the discriminator 66b by a clock synchronizing with the rear edge from the PLL circuit 67b. Each of the discriminated data is synthesized by the synthesizer 68, and is demodulated by the demodulator 69. In this way a final data is obtained.

The independent detection of an ascending pulse edge and a descending edge pulse is advantageous in that data is reproduced irrespective of a variation in the length of a record pit after compensating the steady edge shift. This is because variations in each edge pulse due to changes in the length of the record pit are considered to be constant throughout a series of record data. However, it has no effect to the edge shift depending on the record pattern. The edge shift depending on the record pattern has been hitherto supposed to be compensated at the time of recording, and several techniques have been proposed for the recording compensating system (Japanese Patent Application Laid-Open No. 5-290437, corresponding to U.S. Pat. No. 5,513, 165, etc.). Henceforth, however, when the record pit becomes much smaller for the purpose of enhancing the density, the rate of edge shift to channel clock increases. Therefore, the effect of residue of recording compensation cannot be ignored.

In the front and rear edge independent detecting system as mentioned above, when detecting a signal of higher density, the C/N (S/N) ratio becomes worse, and it is impossible to detect correctly in the two-stage differential method or slice method employed in the edge detector 65. In order to solve the problem, a partial response maximum likelihood (PRML) system is proposed (Japanese Patent Application Laid-Open No. 8-87828, corresponding to EP No. 652,559, etc.).

This PRML system demodulates information modulated and recorded in accordance with partial response characteristic by a maximum likelihood method (Viterbi decoding). More specifically, a signal with a limit of run-length which has been modulated in accordance with partial response characteristic is stored in an optical disk, and a reproduction signal obtained from the optical disk is sampled by an analog/digital (A/D) converter, and the transition of a maximum likelihood signal is fixed in accordance with a predetermined algorithm. A reproduction data is generated on the basis of the fixed transition of the signal.

Referring to FIG. 3, the reproduction structure of the PRML system will be more particularly described:

The PRML system includes an optical disk 1 under which an optical head 2 is provided to obtain a reproduction signal representing a record data in the optical disk 1. The optical head 2 outputs the reproduction signal to an amplifier 3. The amplifier 3 amplifies the inputted reproduction signal, and outputs it to an equalizer 4 which shapes the amplified reproduction signal and delivers it to a low-pass filter (LPF) 5. The LPF 5 cuts off high-frequency portions of the reproduction signal beyond a predetermined value, and outputs low-frequency portions thereof to a front edge A/D converter 6a, a rear edge A/D converter 6b and a binary circuit 8. Each A/D converter 6a and 6b samples the shaped reproduction signal, and outputs the sampling value to a front edge maximum likelihood detector 7a and a rear edge maximum likelihood detector 7b. Each maximum likelihood detector 7a and 7b generates a front edge maximum likelihood signal and a rear edge maximum likelihood signal on the basis of the sampling value of the reproduction signal, and outputs it to a synthesizer 70.

The binary circuit 8 converts the shaped reproduction signal into a binary signal, for example, by using a predetermined slicing level, and after dividing it into a front edge signal and a rear edge signal, outputs each of them to a front edge PLL circuit 9a and a rear edge PLL circuit 9b. Each PLL circuit 9a and 9b generates a timing clock synchronizing with the reproduction signal on the basis of the binary signal, and outputs it to the respective A/D converter 6a, 6b and the synthesizer 70. Each A/D converter 6a and 6b samples the respective signal in synchronism with the timing clock, and each maximum likelihood detector 7a and 7b generates a maximum likelihood signal in synchronism with the timing clock. The synthesizer 70 synthesizes the front edge maximum likelihood signal and the rear edge maximum likelihood signal and outputs the synthesized signal to a demodulator 10. The synthesizer 70 synthesizes the front edge timing clock and the rear edge timing clock and outputs the synthesized clock to the demodulator 10. The demodulator 10 demodulates the synthesized signal to produce a final reproduction data.

The operation will be described:

A reproduction signal having a partial response characteristic corresponding to the maximum likelihood detection is obtained by the optical head 2 from the optical disk 1, and is delivered to the A/D converters 6a and 6b, and the binary circuit 8 through the amplifier 3, the equalizer 4 and the LPF 5. A binary signal after division of front edge and rear edge is delivered to the respective PLL circuit 9a, 9b from the binary circuit 8. A timing clock synchronizing with each binary signal is respectively delivered to the A/D converter 6a, 6b and the maximum likelihood detector 7a, 7b from the PLL circuit 9a, 9b. In accordance with the timing clock, the A/D converter 6a, 6b and the maximum likelihood detectors 7a, 7b are operated. Each of the A/D converter 6a and 6b obtains a sampling value, and each of the maximum likelihood detector 7a and 7b fixes the transition of the maximum likelihood signal from the sampling value in accordance with a predetermined algorithm. A front edge maximum likelihood signal and a rear edge maximum likelihood signal, both equivalent to the reproduction signal, are obtained on the basis of the fixed transition of the maximum likelihood signal. After the front edge maximum likelihood signal and the rear edge maximum likelihood signal are synthesized by the synthesizer 70, the synthesized signal is demodulated by the demodulator 10. A final reproduction data is obtained.

In the PRML data reproduction system described above the frequency of the timing clock generated in the PLL circuits 9a and 9b cannot be higher than about 20 MHz so long as the optical disks currently available are used. If a more dense data record is in need, a doubled or more frequency will be required. A high-speed, high-bit A/D converter is costly. As shown in FIG. 3, the PRML system requires two A/D converters, which reflects in the production cost. Besides, same as in the above conventional front and rear edge independent detecting system, the recording compensation residue of edge shift depending on the record pattern cannot be compensated. Moreover, in the PRML of higher detecting capacity, since the restraint length is longer and the circuit scale increases, the circuit scale is twice as large if two systems of maximum likelihood detecting circuit are provided for independent detection of front and rear edges, and it is hard to realize.

BRIEF SUMMARY OF THE INVENTION

It is hence an object of the invention to provide a data reproducing method of optical disk by maximum likelihood detecting system capable of compensating a stationary edge shift and an edge shift depending on record pattern when reproducing data whose edge position is recorded in an optical disk.

It is another object of the invention to provide a data reproducing apparatus of optical disk possessing a Viterbi detecting system capable of compensating a stationary edge shift and an edge shift depending on record pattern when reproducing.

It is a further object of the invention to provide a data reproducing apparatus and reproducing method of optical disk capable of compensating an edge shift only by using one A/D converter.

A data reproducing apparatus of the invention has means for obtaining a reproduction waveform from an optical disk in which edge position of data is recorded, means for converting the obtained reproduction waveform into a digital value, means for detecting data by maximum likelihood detection on the basis of the converted digital value, recognizing means for recognizing the pattern of recorded data, and compensating means for compensating the edge shift according to the recognition result the recognizing means.

The compensating means includes means for storing plural tables indicating the values for compensating edge shift, means for selecting one table from the plural tables on the basis of the digital value of reproduction waveform of predetermined data whose edge position is recorded, and means for compensating the edge shift by referring to the selected table. The plural tables are tables showing compensation amounts of expected values in branch metric calculation of maximum likelihood detection.

The recognizing means either recognizes the pattern of data by using an ACS output of maximum likelihood detection, or recognizes the pattern of data by using the data in a path memory of maximum likelihood detection.

The compensating means compensates the edge shift by setting an expected value in branch metric calculation of maximum likelihood detection.

According to the invention, the edge shift not compensated completely at the time of recording in an optical disk is compensated while recognizing the pattern of record data at the time of reproduction. At this time, controlling the expected value in branch metric calculation of maximum likelihood detection, the edge shift is compensated. For example, plural expected value compensation tables are prepared, in which the compensation amount of this expected value is set in every pattern of record data, and an optimum expected value compensation table is selected among them, and the expected value is determined in each pattern of record data by referring to the selected expected value compensation table.

Predetermined data recorded in VFO area, SYNC area and so on before the data area of the optical disk is detected by maximum likelihood detection, and the edge shift amount is calculated on the basis of the detection data, and the expected value compensation table closest to the calculated edge shift amount is selected to be optimum. In data detection processing in data area of optical disk, the pattern of the record data is recognized by using the output (path metric) of ACS or the pattern in the path memory, and the expected value depending on the pattern of the record data is determined by referring to the selected expected value compensation table, and the determined expected value is used in branch metric calculation, thereby executing maximum likelihood detection.

In the invention, since both the stationary edge shift and the edge shift due to record compensation residue depending on the record pattern can be compensated in every sector, the record margin and reproduction margin increase. Besides, if the PRML system of large restraint length and high detecting capacity is introduced, it is not necessary to install two systems for the front and rear edges, and the constitution can be composed in one system having one A/D converter, and the circuit composition is simple, so that it is easier to lower the cost, reduce the size, and save electric power.

The above and further objects and features of the invention will more fully be apparent from the following detailed description with the accompanying drawings.

BRIEF DESCRIPTION OF THE SEVERAL VIEWS OF THE DRAWING

FIG. 6 is a diagram showing a combination of three values and four states.

FIG. 12 is a diagram showing an expected value compensation table.

FIGS. 15A and 15B are diagrams showing edge shift in VFO area.

FIGS. 20A and 20B are diagrams showing an example of effect of the invention (with edge shift, without compensation).

FIGS. 21A and 21B are diagrams showing an example of effect of the invention (with edge shift, with compensation).

FIGS. 23A and 23B are diagrams showing the relationship of outputs of plural AND units and output of a data converter in the data pattern recognition unit shown in FIG. 22.

DESCRIPTION OF THE PREFERRED EMBODIMENTS

Figure 1:
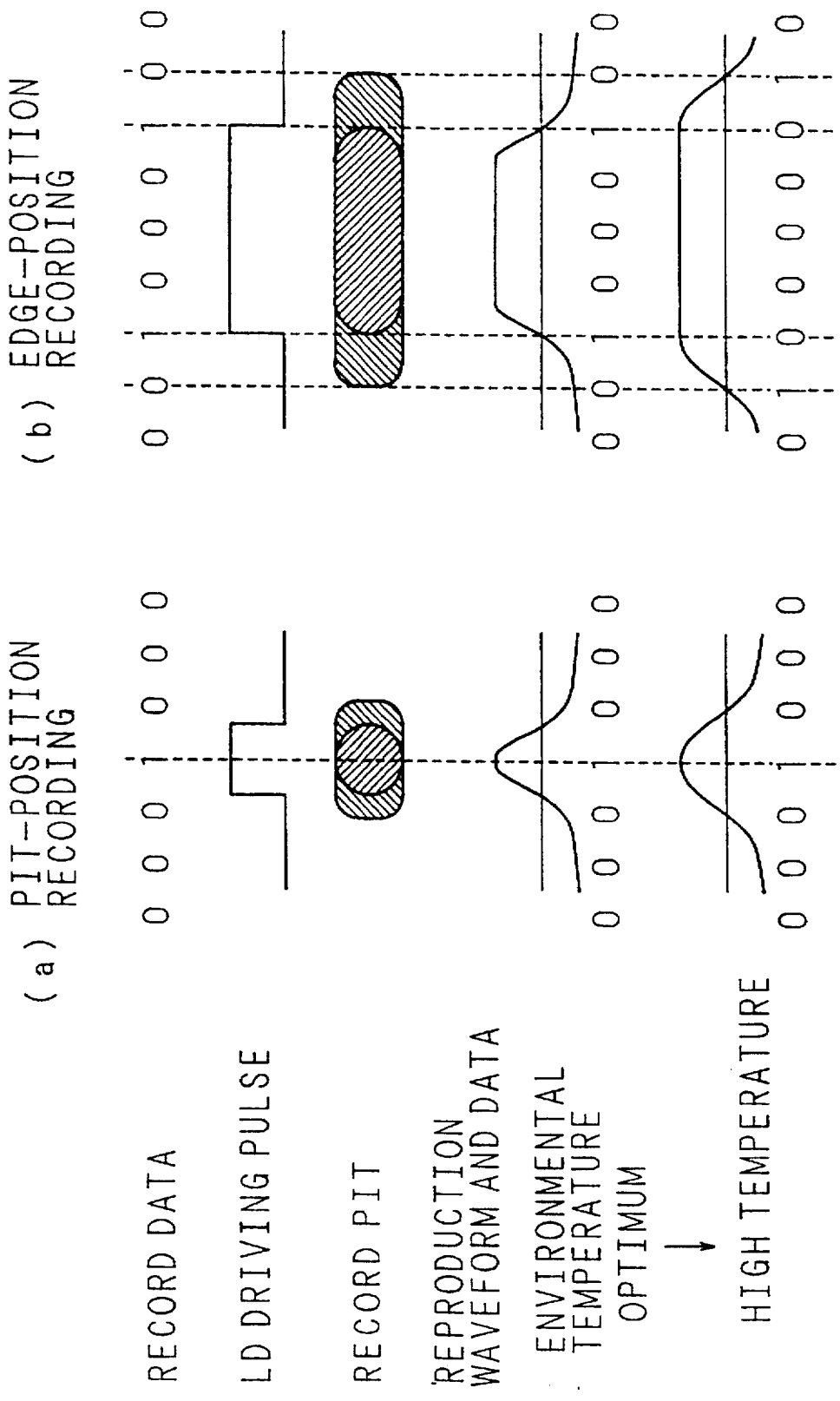
FIG. 1 is a diagram showing the relationship of record data, record pit, and edge shift.
Figure 2:
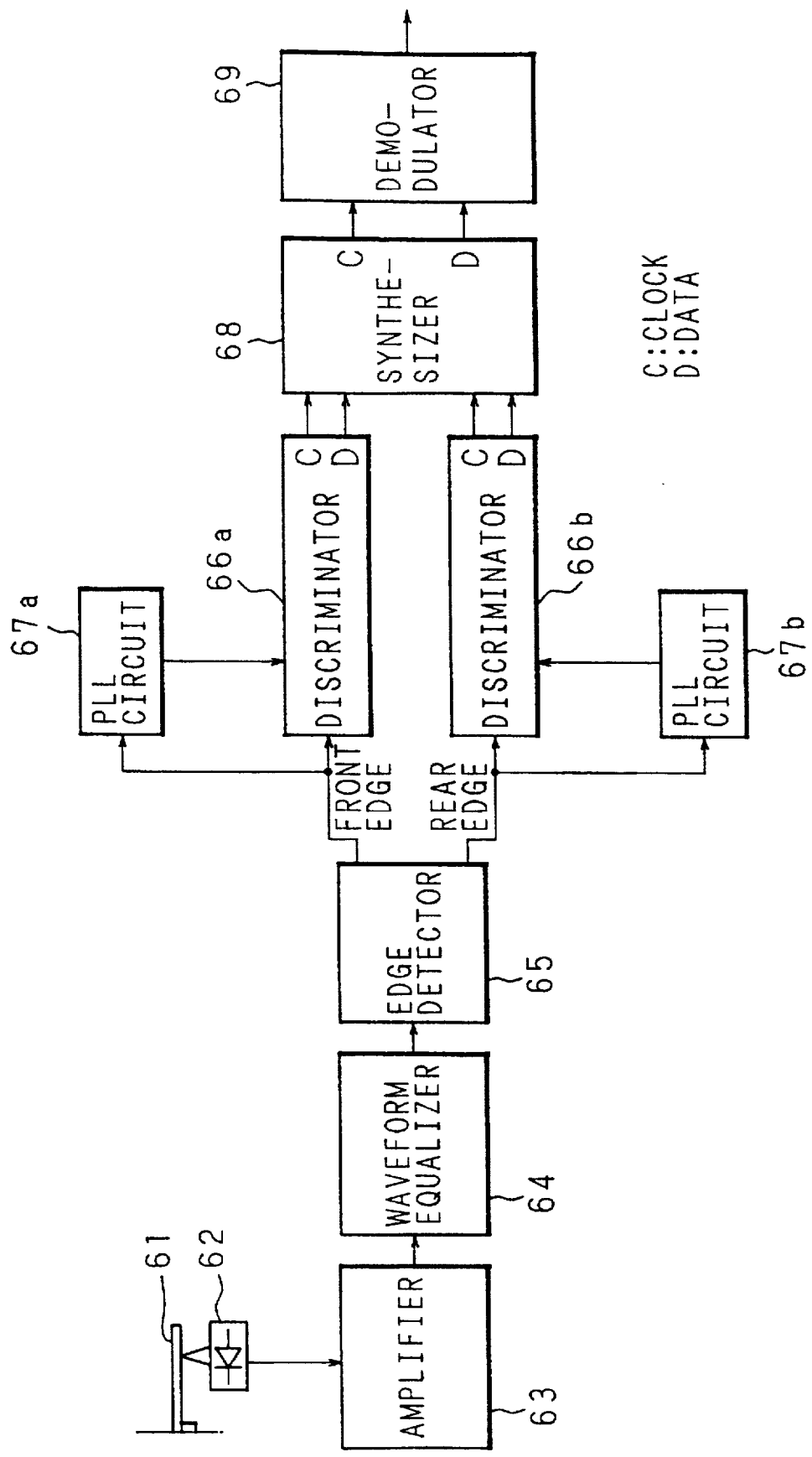
FIG. 2 is a block diagram of a prior art (front and rear edge independent detecting system).
Figure 3:
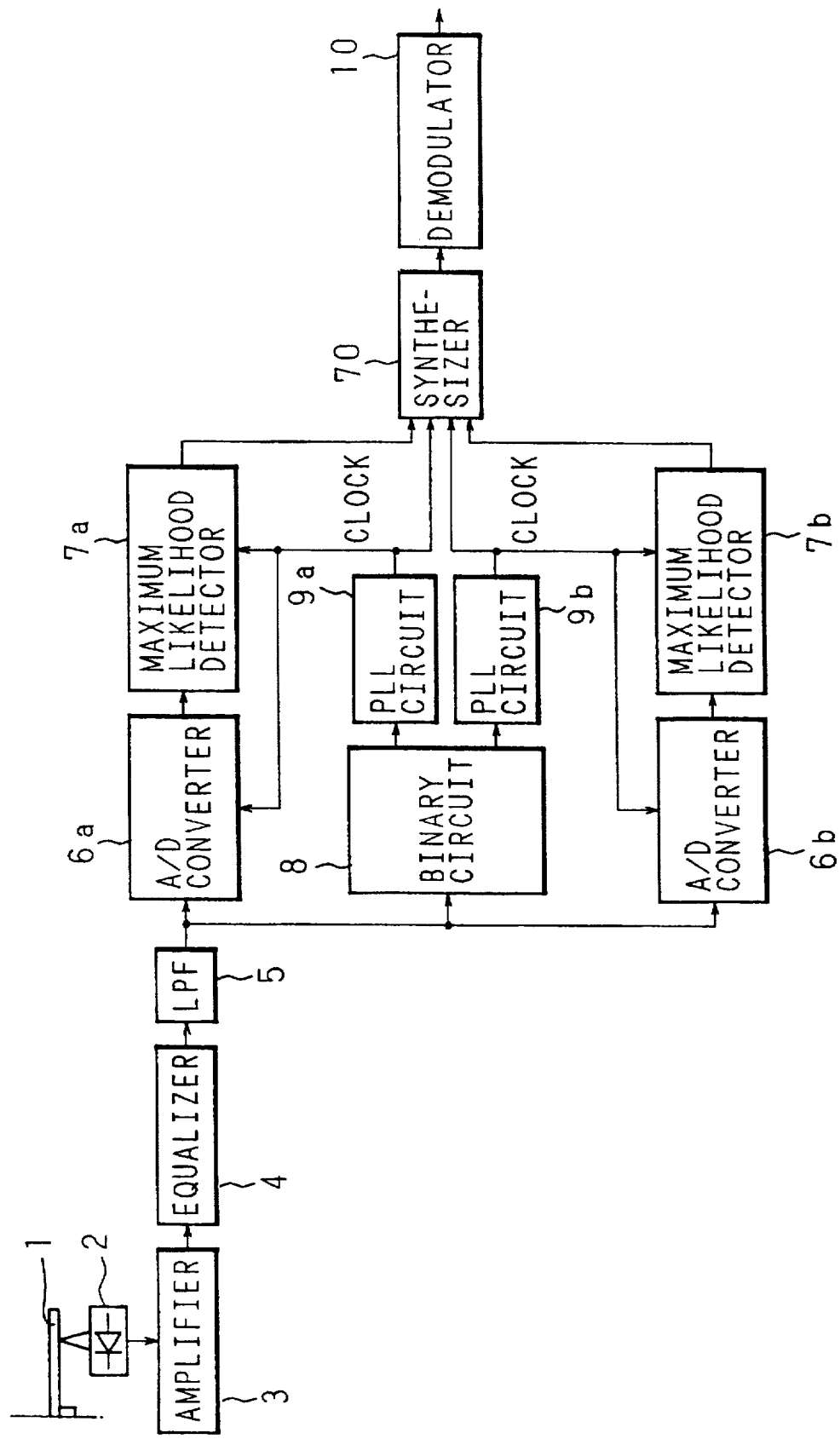
FIG. 3 is a block diagram of a prior art (maximum likelihood detection corresponding to front and rear edge independent detection).

Referring now to the drawings, embodiments of the invention are described in detail below.

Figure 4:
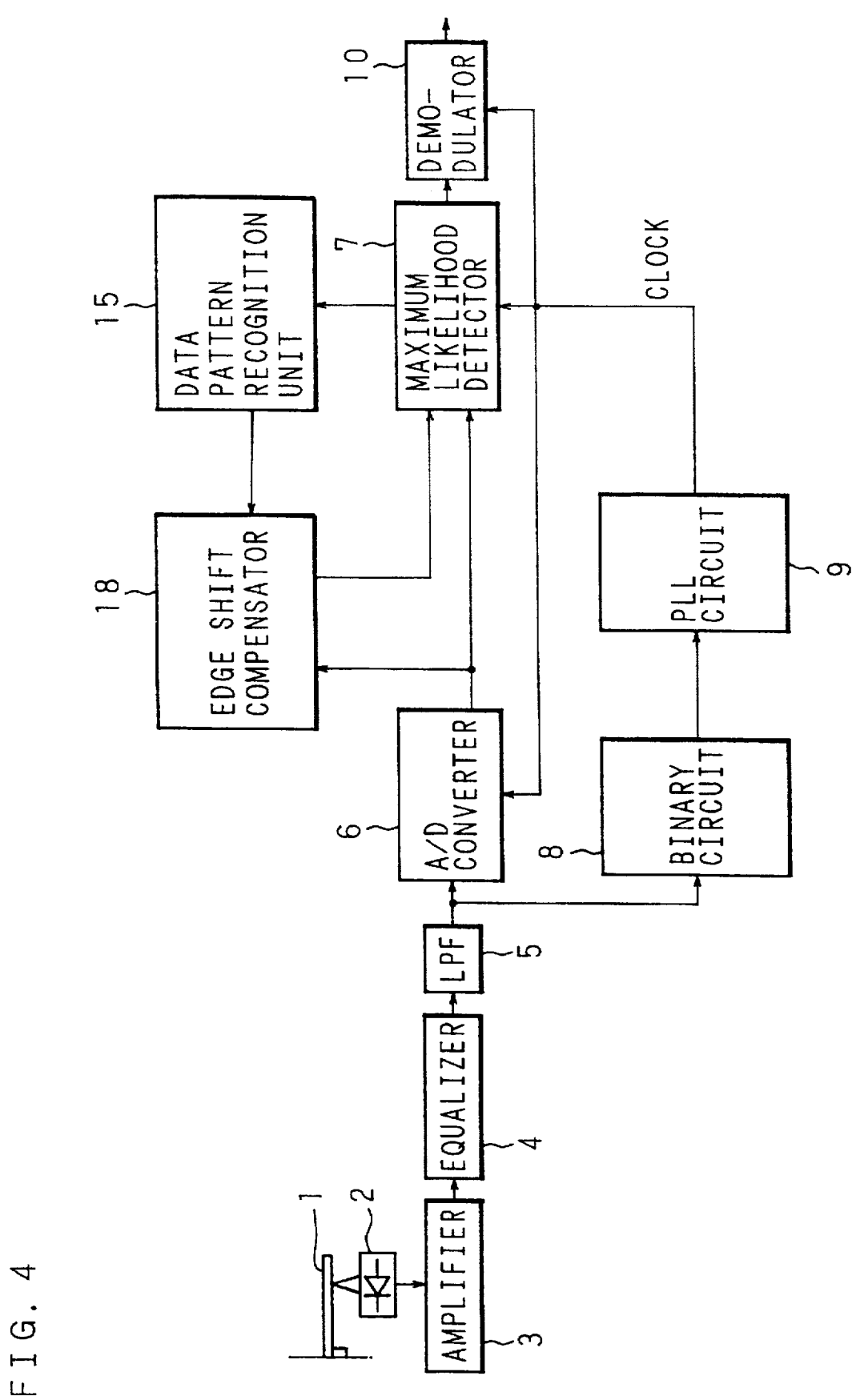
FIG. 4 is a block diagram of an embodiment of the invention.

FIG. 4 is a block diagram showing an embodiment of the invention. In each process of operation, it is supposed to be synchronized with the front edge. In FIG. 4, reference numeral 1 denotes an optical disk, and an optical head 2 for obtaining a reproduction signal corresponding to record data of the optical disk 1 is provided beneath the optical disk 1, and the optical head 2 delivers a reproduction signal to an amplifier 3. The amplifier 3 amplifies the input reproduction signal, and delivers to an equalizer 4. The equalizer 4 shapes the waveform of the amplified reproduction signal, and supplies to a low pass filter (LPF) 5. The LPF 5 cuts off the high frequency components over a predetermined frequency, and delivers a reproduction signal in a low frequency range to an A/D converter 6 and a binary circuit 8.

The A/D converter 6 samples the shaped reproduction signal, and delivers the sampling value to a maximum likelihood detector 7 and an edge shift compensator 18. The maximum likelihood detector 7 generates a maximum likelihood decoding signal while compensating the edge shift on the basis of the sampling value of the reproduction signal, and delivers to a demodulator 10 and a data pattern recognition unit 15. The data pattern recognition unit 15 recognizes the pattern of the data (defined by the length of mark and space length of consecutive marks) recorded in the optical disk 1, and delivers to the edge shift compensator 18. The edge shift compensator 18 compensates the edge shift in maximum likelihood detection in the maximum likelihood detector 7.

The binary circuit 8 converts the shaped reproduction signal into a binary signal by using a predetermined slice level, divides the binary signal into a front edge and a rear edge, and, so as to synchronize with the front edge signal, delivers the binary signal of the front edge to a PLL circuit 9. The PLL circuit 9 generates a clock signal synchronized with the front edge on the basis of this binary signal, and delivers to the A/D converter 6, maximum likelihood detector 7, and demodulator 10. The A/D converter 6, maximum likelihood detector 7, and demodulator 10 operate in synchronism with this clock signal from the PLL circuit 9.

The operation is described below. The reproduction signal from the optical head 2 passes through the amplifier 3, equalizer 4, and LPF 5, and is equalized to a partial response (RP) signal corresponding to maximum likelihood detection (Viterbi detection), and is supplied into the A/D converter 6 and binary circuit 8. The reproduction signal is divided into a front edge binary signal and a rear edge binary signal in the binary circuit 8, and the front edge binary signal is supplied into the PLL circuit 9. From the PLL circuit 9, a clock signal synchronized with the front edge is supplied into the A/D converter 6, maximum likelihood detector 7, and demodulator 10, and the A/D converter 6, maximum likelihood detector 7 and demodulator 10 operate on the basis of this clock signal.

In the A/D converter 6, the reproduction signal is sampled, and the sampling value is issued to the maximum likelihood detector 7. In the maximum likelihood detector 7, a maximum likelihood decoding signal is generated on the basis of the sampling value of the reproduction signal, and is delivered to the demodulator 10. In the demodulator 10, the maximum likelihood decoding signal is demodulated, and final reproduction data is obtained.

Herein, since the A/D converter 6 operates at the clock synchronized with the front edge, a correct sampling value is obtained as for the front edge. However, since the rear edge contains an edge shift, and the sampling value is deviated from an ideal partial response. In the invention, therefore, such edge shift is compensated by the processing in the maximum likelihood detector 7, data pattern recognition unit 15, and edge shift compensator 18 as mentioned below.

Figure 5:
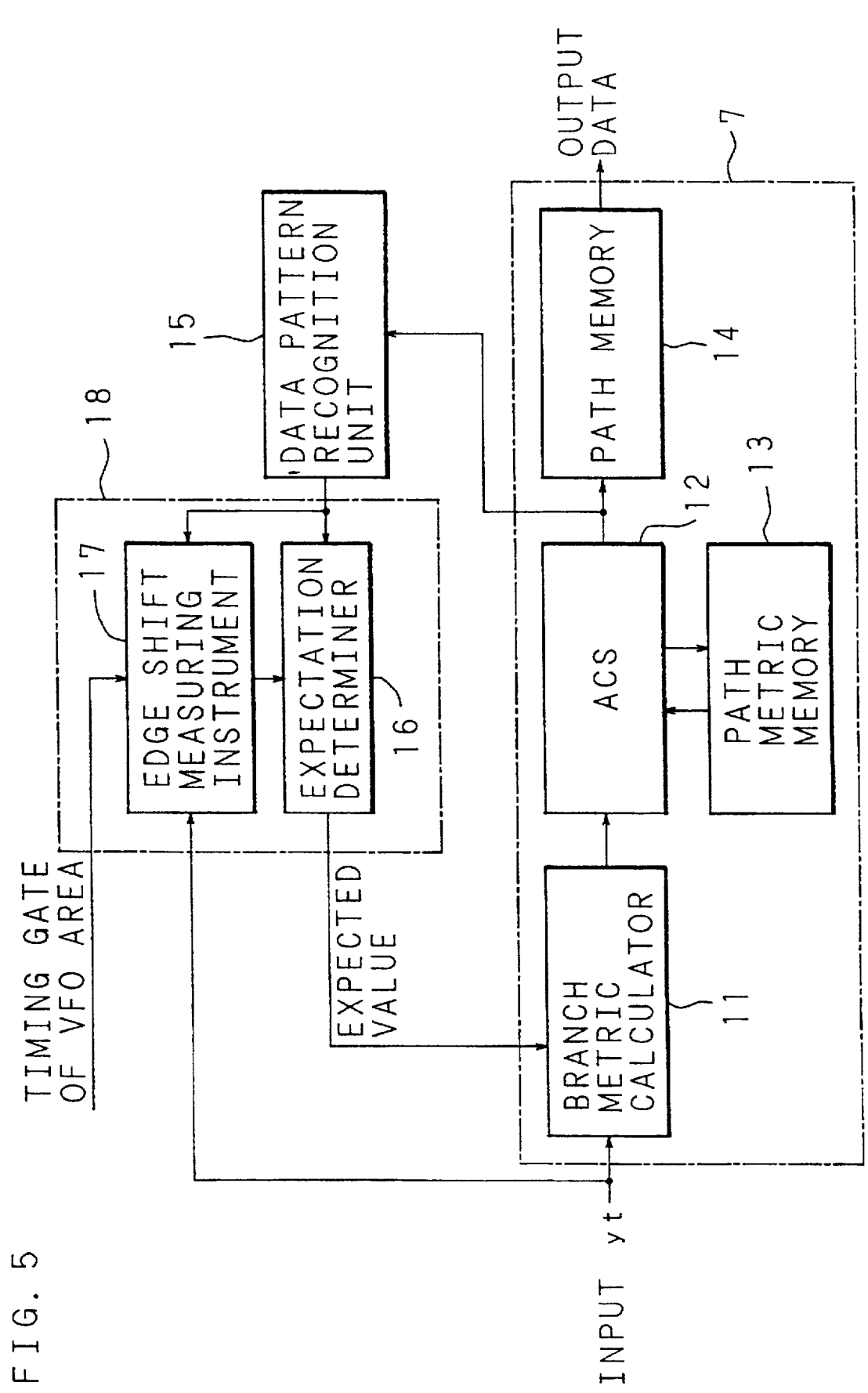
FIG. 5 is an internal block diagram of a maximum likelihood detector and an edge shift compensator.

FIG. 5 is a diagram showing the internal constitution of the maximum likelihood detector 7 and edge shift compensator 18. The maximum likelihood detector 7 includes a branch metric calculator 11 for calculating the branch metric according to the sampling value from the A/D converter 6, an ACS (add-compare-select) 12 for determining the path metric by using the branch metric, a path metric memory 13 for storing the determined path metric, and a path memory 14 for accumulating the data corresponding to the selected path. The data pattern recognition unit 15 recognizes the pattern of record data (space length and mark length) on the basis of the output from the ACS 12. The edge shift compensator 18 includes an expectation determiner 16 for selecting one expected value compensation table from plural expected value compensation tables in which compensation amounts of expected values in branch metric calculation are set, and determining the expected value on the basis of the pattern of the record data, and an edge shift measuring instrument 17 for measuring the edge shift on the basis of the sampling value of the reproduction signal in a VFO area of the optical disk 1.

Hereinafter, a specific operation (maximum likelihood (Viterbi) detection) in the maximum likelihood detector 7, data pattern recognition unit 15, and edge shift compensator 18 is described. The following description refers to three-value, four-state PR (1, 1) ML (restraint length 3) incorporating the feature of $1/7$ modulation code (at least two pieces of data "1" or "0" should be continuous in ZRZI expression). Combinations of three-value, four-state PR (1, 1) ML status are shown in FIG. 6.

According to combinations of data values $a_{t-1}$, at two moments t−1, t adjacent in time, four states S0 to S3 are set as follows.

Data value $(a_{t-1}, a_t)=(0, 0)$: State S0
Data value $(a_{t-1}, a_t)=(1, 0)$: State S1
Data value $(a_{t-1}, a_t)=(0, 1)$: State S2
Data value $(a_{t-1}, a_t)=(1, 1)$: State S3

Figure 7:
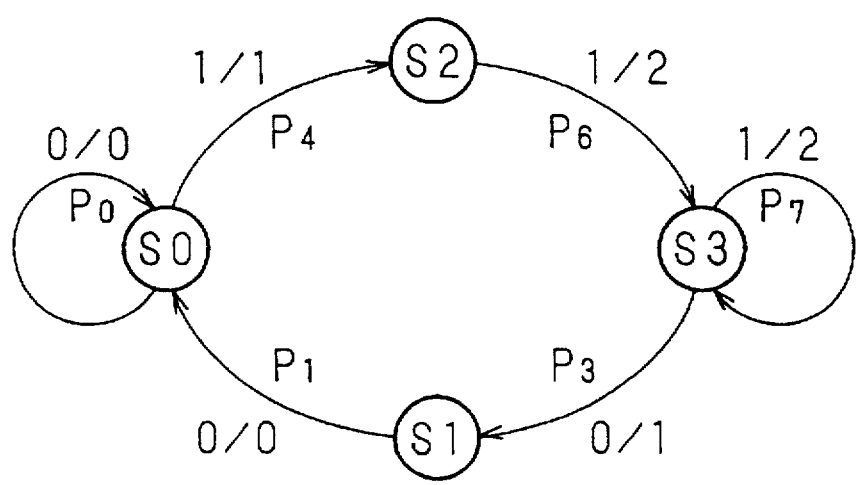
FIG. 7 is a diagram showing a state transition of three values and four states.

By thus setting the states, there are six combinations of states as shown in FIG. 6. Being of $1/7$ modulation, at least two pieces of same data value must be continuous, and hence combinations of S2→S1, S1→S2 do not exist. The expected value $P_h$ in each combination $(=a_t+a_{t-1}$: reproduction level expected theoretically when an ideal RP is performed) is any one of three values 0, 1, 2 as shown in FIG. 6. FIG. 7 shows a state transition diagram plotted on the basis of combinations of states shown in FIG. 6.

A sampling value $y_t$ is sent from the A/D converter 6 into the branch metric calculator 11 in FIG. 5, and on the basis of this sampling value $y_t$, six branch metrics are calculated with respect to the expected value $P_h$. These six branch metrics $BM_0$ to $BM_7$ ($BM_2$ and $BM_5$ are not present) are specifically determined in the following formulas (1) to (6) according to the method of least squares.

$$BM_0=(y_t-P_0)^2=y_t^2 \qquad (1)$$

$$BM_1=(y_t-P_1)^2=y_t^2 \qquad (2)$$

$$BM_3=(y_t-P_3)^2=(y_t-1)^2 \qquad (3)$$

$$BM_4=(y_t-P_4)^2=(y_t-1)^2 \qquad (4)$$

$$BM_6=(y_t-P_6)^2=(y_t-2)^2 \qquad (5)$$

$$BM_7=(y_t-P_7)^2=(y_t-2)^2 \qquad (6)$$

The calculated branch metrics are inputted to the ACS 12, and the ACS 12 calculates four path metrics $PM_{(t,0)}$ to $PM_{(t,3)}$ at time t (integrated values of branch metrics), by using these branch metrics and path metrics at time t−1 stored in the path metric memory 13. Specific formulas of these four path metrics are shown in formulas (7) to (10) below.

$$PM_{(t,0)}=min\ (PM_{(t-1,0)}+BM_0, PM_{(t-1,1)}+BM_1) \qquad (7)$$

$$PM_{(t,1)}=PM_{(t-1,3)}+BM_3 \qquad (8)$$

$$PM_{(t,2)}=PM_{(t-1,0)}+BM_4 \qquad (9)$$

$$PM_{(t,3)}=min\ (PM_{(t-1,2)}+BM_6, PM_{(t-1,3)}+BM_7) \qquad (10)$$

As the path to state S0, as known from the state transition shown in FIG. 7, the path from state S0 and the path from state S1 may be considered. Of these two paths, the probability as the path is higher in the one smaller in the value of the path metric, and hence, as shown in formula (7), the smaller path metric is selected as the path metric $PM_{(t,0)}$ at time t. The path to state S1 is limited to the path from state S3 as known from FIG. 7, and therefore the path metric $PM_{(t,1)}$ at time t is calculated only from $PM_{(t-1,3)}$ as shown in formula (8). Similarly, the path to state S2 is limited to the path from state S0 as known from FIG. 7, and therefore the path metric $PM_{(t,2)}$ at time t is calculated only from $PM_{(t-1,0)}$ as shown in formula (9). On the other hand, as the path to state S3, as known from FIG. 7, the path from state S2 and the path from state S3 may be considered, and hence, as shown in formula (10), the smaller path metric is selected as the path metric $PM_{(t,3)}$ at time t.

Next, occurrence of merge is considered. The magnitude relation of two elements in $PM_{(t,0)}$ and $PM_{(t,3)}$ has four conditions as expressed in formulas (7a), (7b), and (10a), (10b) below.

$$PM_{(t-1,0)} + BM_0 < PM_{(t-1,1)} + BM_1 \quad (7a)$$

$$PM_{(t-1,0)} + BM_0 \geqq PM_{(t-1,1)} + BM_1 \quad (7b)$$

$$PM_{(t-1,2)} + BM_6 < PM_{(t-1,3)} + BM_7 \quad (10a)$$

$$PM_{(t-1,2)} + BM_6 \geqq PM_{(t-1,3)} + BM_7 \quad (10b)$$

Figure 8:
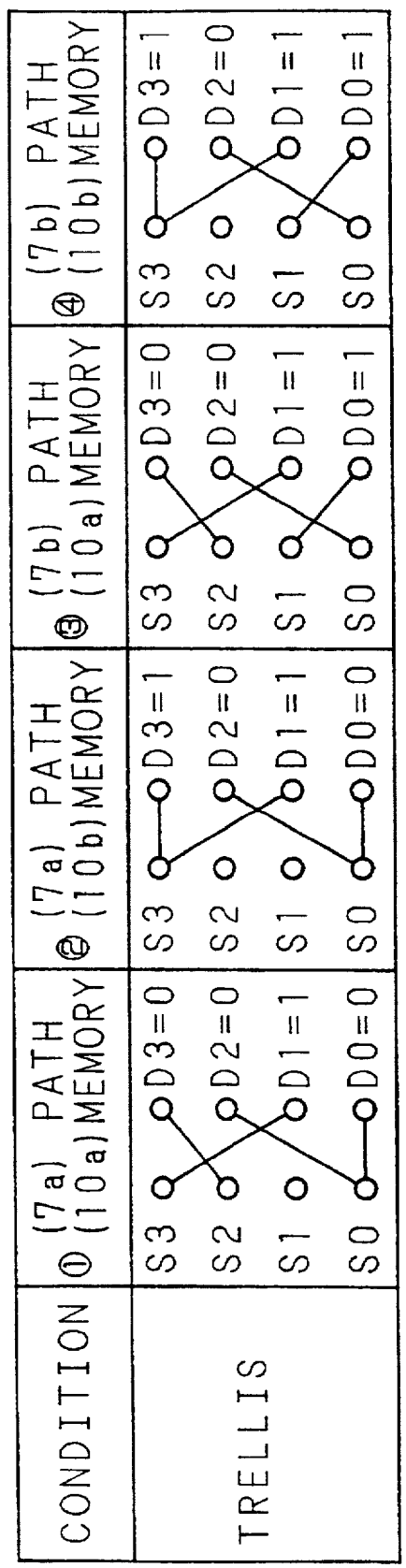
FIG. 8 is a diagram showing types of merge.

Merges occurring by combination of these conditions can be classified into four types of merges as shown in FIG. 8. As mentioned above, since the paths to state S1 and S2 are determined automatically, there are four types of merges according to the combinations of paths toward state S0 and S3. Condition ① satisfies formulas (7a) and (10a), showing state S0→S0 and S2→S3. Similarly, condition ② satisfies formulas (7a) and (10b), showing state S0→S0 and S3→S3. condition ③ satisfies formulas (7b) and (10a), showing state S1→S0 and S3→S3, and condition ④ satisfies formulas (7b) and (10b), showing state S1→S0 and S3→S3. In each condition, data shown in FIG. 8 is supplied in four lines of inputs D0 to D3 of the path memory 14 described below.

Figure 9:
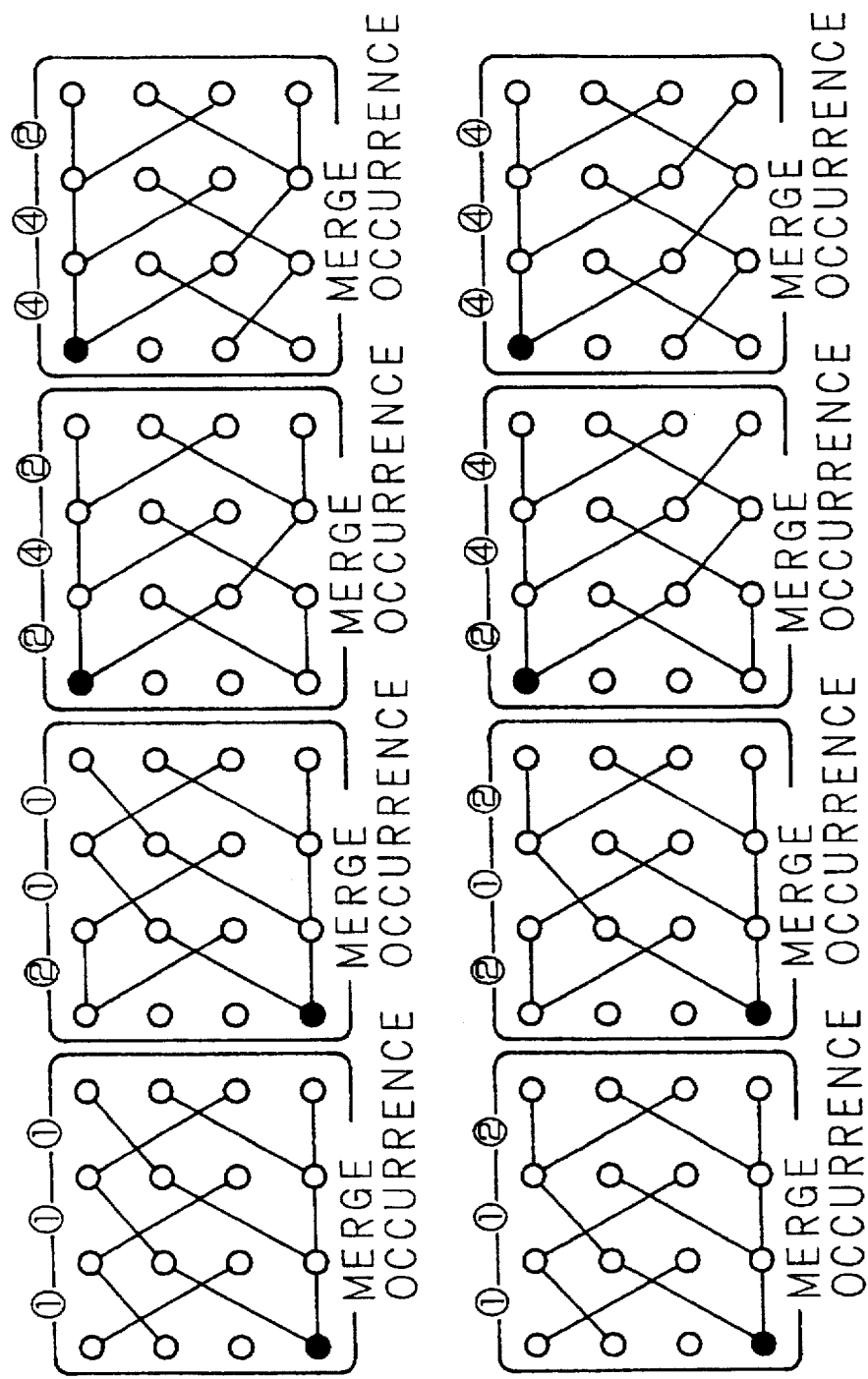
FIG. 9 is a diagram showing combinations of path merge.

Among the four types of merge combinations above, a path merge occurs when at least three merges are combined. Combinations of path merges occurring from three merges amount to eight types as shown in FIG. 9. In FIG. 9, the bullet mark indicates the past data value that is sure to reach by passing any branch. Hence, in the event of a merge as shown in FIG. 9, since all past paths converge on the data value of bullet mark, the data value of the bullet mark is fixed. Such fixing process is effected in the path memory 14, and the fixed data value is read out and delivered from the path memory 14.

Figure 10:
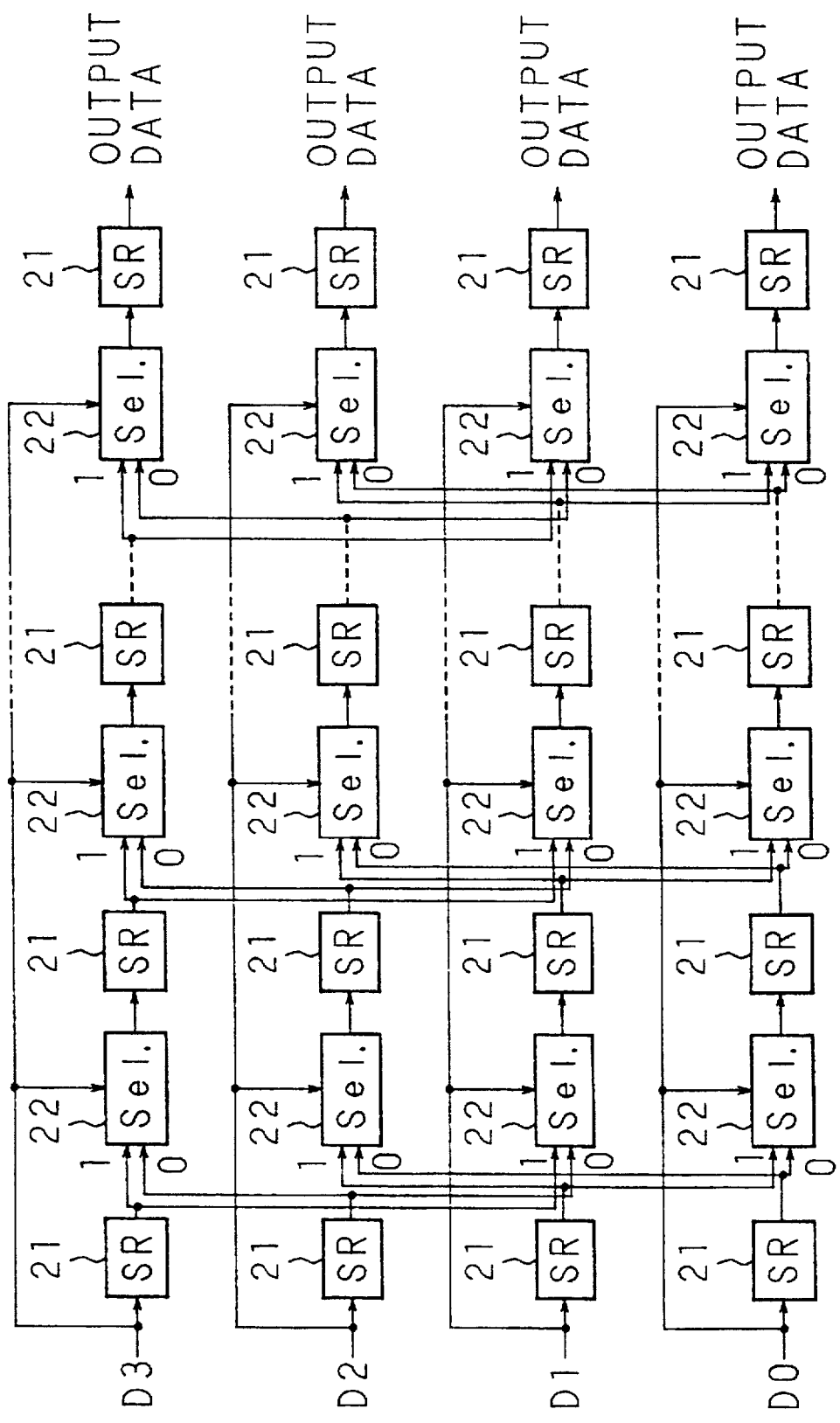
FIG. 10 is an internal block diagram of the path memory in FIG. 5.

FIG. 10 shows a configuration of the path memory 14. The path memory 14 has plural stages of a set of shift register (SR) 21 and selector (Sel.) 22 in each one of four lines (D0 to D3). Each shift register 21 operates on the clock synchronism, and the selector 22 is provided before the shift register 21, so that the data entering the shift register 21 may be selected.

Data selected in each path metric is inputted to D0 to D3. The input data is determined according to the type of merge in FIG. 8. For example, when "1" is inputted to D3, the path of S3→S3 is judged to be correct from FIG. 8, and hence all shift registers 21 of D3 determine the data of D3 at time t−1 as the data at time t. To the contrary, when "0" is inputted to D3, the path of S2→S3 is judged to be correct from FIG. 8, and hence all shift registers 21 of D3 copy the data of D2 at time t−1 as the data at time t. Such operation is done by the shift register 21 and selector 22 in each line. When the bullet mark in FIG. 9 is fixed by occurrence of path merge, each shift register 21 in four lines D0 to D3 at the downstream side of the path memory 14 has same data.

Figure 11:
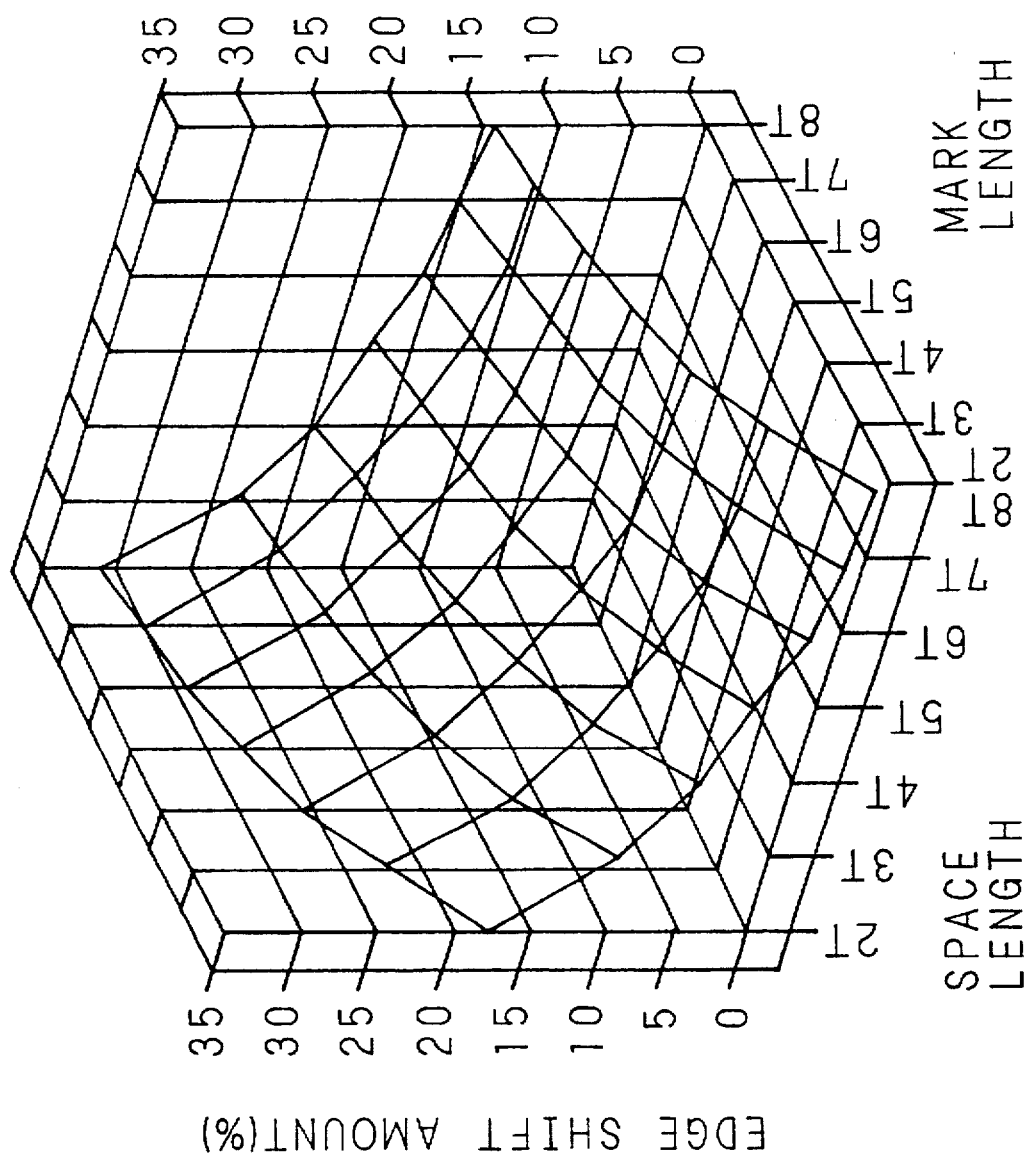
FIG. 11 is an example of edge shift to record data.

An example of edge shift in relation to combination of record data is shown in FIG. 11. FIG. 11 shows standardization of shift amount of rear edge of record mark by channel clock, according to the combination of space length and mark length in 1/7 modulation code. The record mark of mark length 2T succeeding the space length 8T is minimum in heat reserve, and hence its edge shift amount is minimum. On the other hand, the record mark of mark length 8T succeeding the space length 2T is maximum in heat reserve, and hence its edge shift amount is maximum.

Such edge shift amount is determined by the material of optical disk 1, record compensation method, LD power, environmental temperature, etc. Therefore, by investigating about the edge shift of each condition, an edge shift table can be prepared. FIG. 12 shows several types of expected value compensation table expressing compensation amount of expected value under various conditions in branch metric calculation, prepared on the basis of such edge shift table. In the expected value compensation tables in FIG. 12, the compensation amounts of expected values in combinations of space length and record mark length are shown. Such plural expected value compensation tables are preliminarily stored in the expectation determiner 16, and one expected value compensation table is selected from them.

Figure 13:
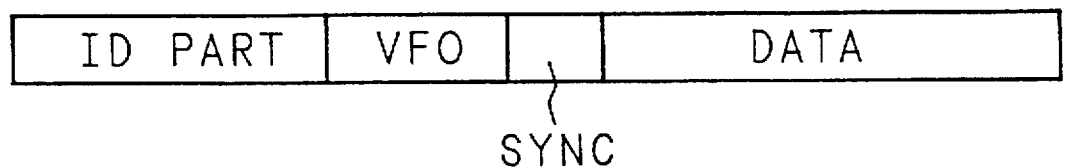
FIG. 13 is a diagram showing record format of an optical disk.

The selection of expected value compensation table is described below. FIG. 13 is a schematic diagram of record format of basic ISO standard of optical disk 1. The ID part in which information for specifying individual sectors is recorded is succeeded by the MO part having a VFO area, SYNC area, and DATA area.

Figure 14:
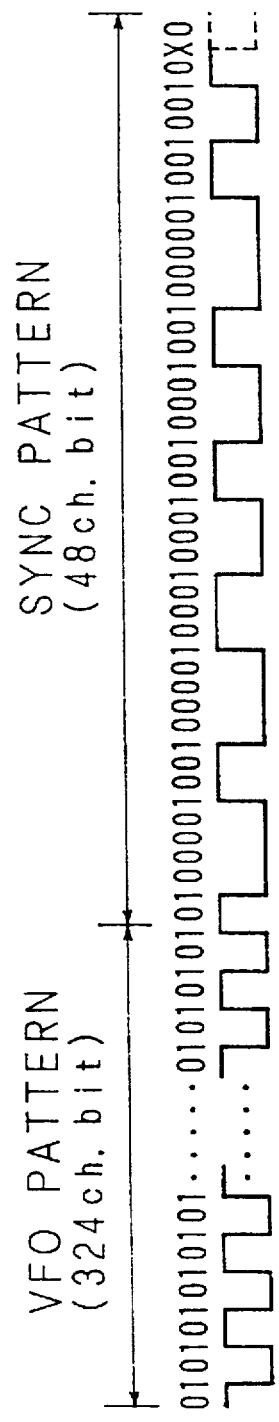
FIG. 14 is a diagram showing VFO pattern and SYNC pattern of optical disk according to ISO specification.

FIG. 14 is a diagram showing a record pattern in VFO area and SYNC area in FIG. 13. In the VFO area, most dense continuous repetitive patterns (most dense pattern of 2T) modulated according to the partial response characteristic are recorded, and in the SYNC area, specific patterns showing the data area are recorded.

Thus, the record pattern in the VFO area is a repetitive pattern of 2T, and a pulse signal corresponding to this repetitive pattern (most dense pattern) is reproduced in the VFO area. FIGS. 15A and 15B are diagrams showing reproduction signals in the VFO area. FIG. 15A is without edge shift, and all ideal points are sampled. By contrast, FIG. 15b is with edge shift, and the sampling point is deviated as the rear edge is shifted. This deviation corresponds to the edge shift. Hence, by measuring the edge shift amount in the VFO area on the basis of the rear edge sampling amount, it is known how much edge shift is possessed by the optical disk 1 to be reproduced. When a timing gate of the VFO area is entered, the edge shift amount in the VFO area is measured in the edge shift measuring instrument 17.

Figure 16:
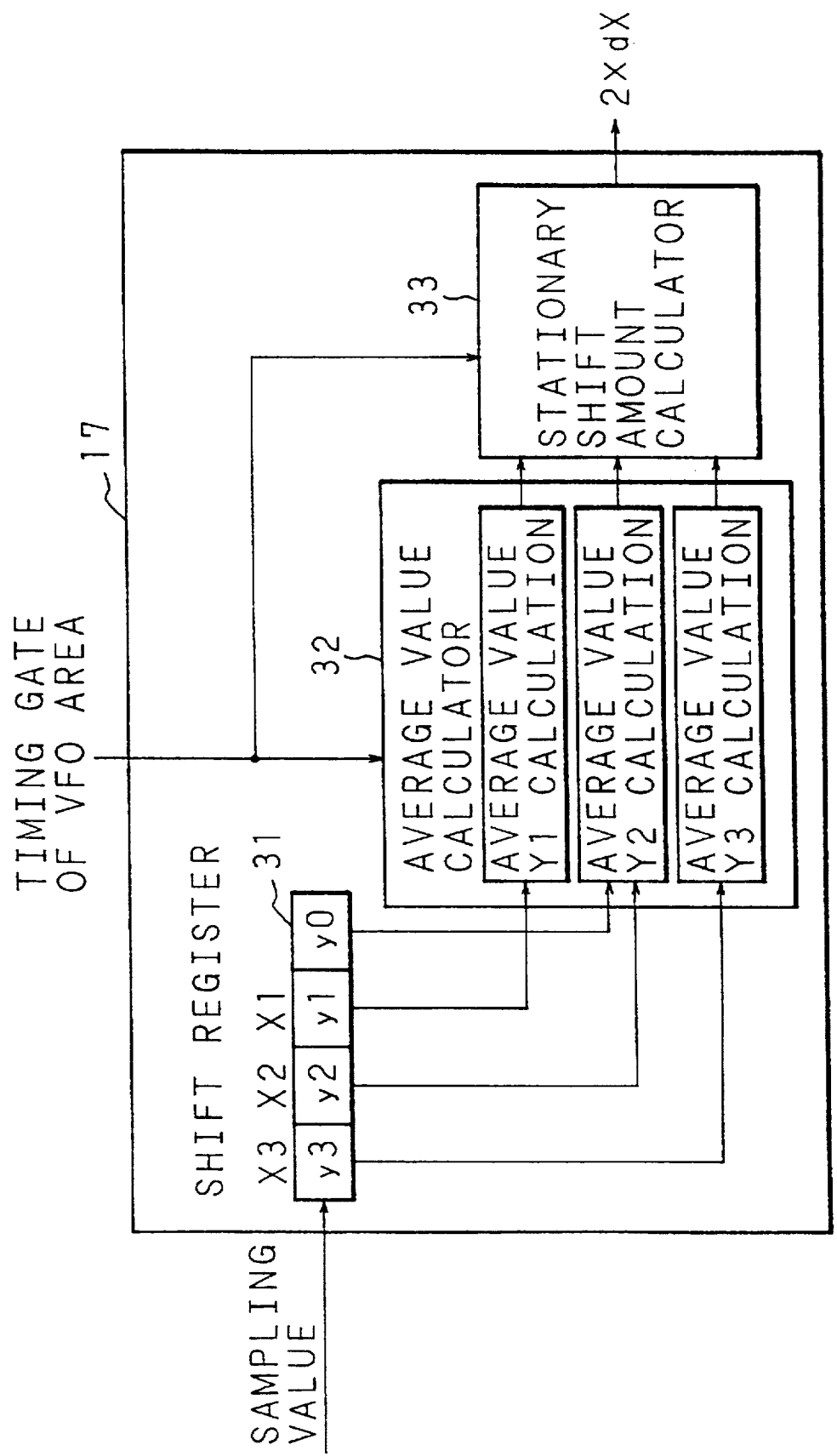
FIG. 16 is an internal block diagram of edge shift measuring instrument in FIG. 5.

FIG. 16 is a block diagram showing an internal structure of the edge shift measuring instrument 17. The edge shift measuring instrument 17 has a shift register 31 for storing sampling values y0, y1, y2, y3 obtained in the A/D converter 6 at sampling moments X0, X1, X2, X3 of each group mentioned below, an average value calculator 32 for calculating average values Y1, Y2, Y3 according to the formulas below by entering the sampling values in repetition of the most dense signal from the shift register 31, and a stationary shift amount calculator 33 for calculating the stationary shift amount according to the formula below (hereinafter called stationary shift amount) 2×dX by using the obtained average values Y1, Y2, Y3.

Figure 17:
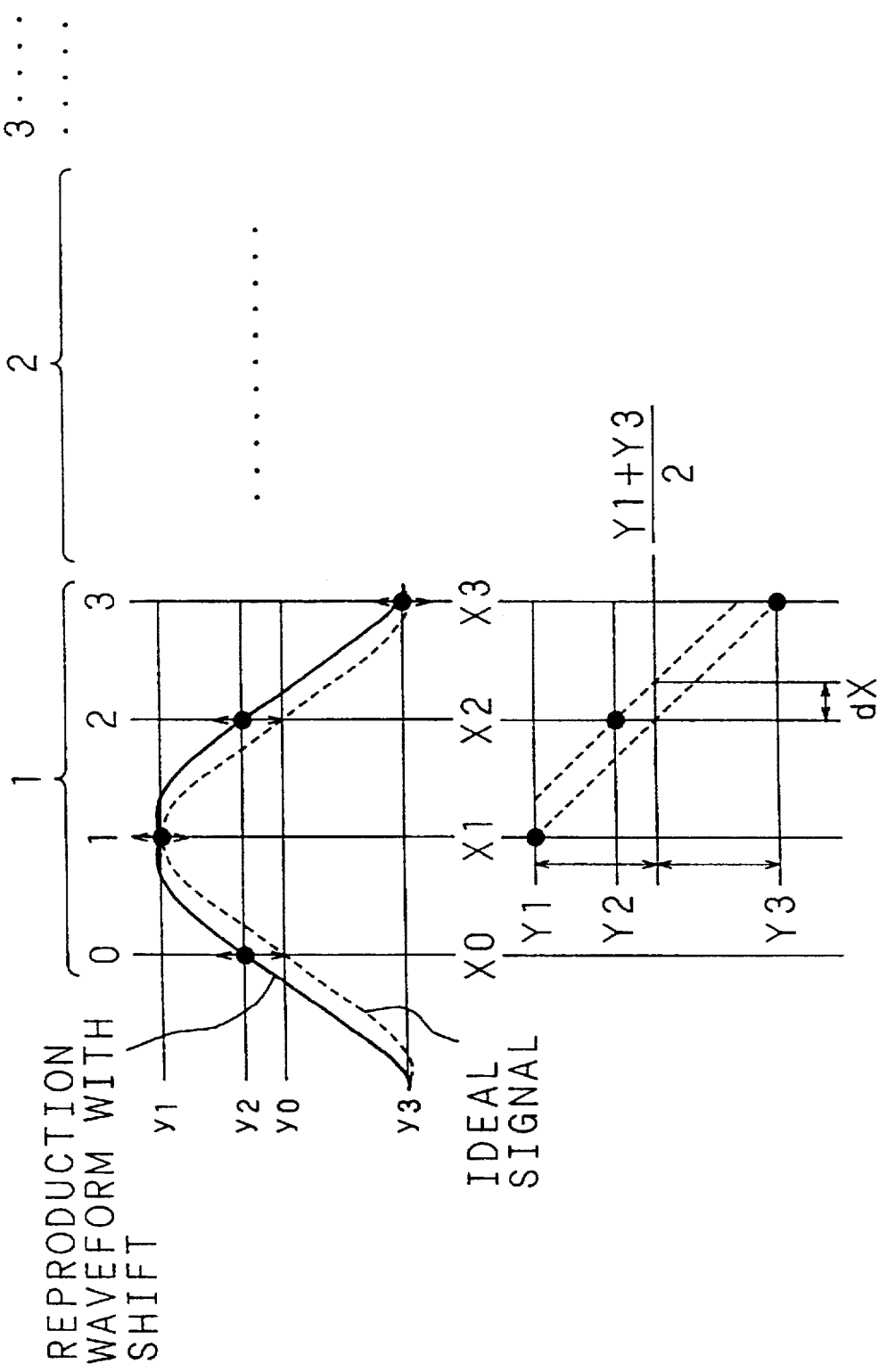
FIG. 17 is a diagram for explaining the principle of edge shift measurement.

The detail of the measuring operation in the edge shift measuring instrument 17 is explained below. FIG. 17 is an explanatory diagram for showing the theory for determining the stationary shift amount. Since the VFO area has the most dense signal, by sampling at the clock, four sampling values are obtained in one period. Supposing four sampling moments in one period to be X0, X1, X2, X3, one period is assumed to be one group, and the sampling values corresponding to sampling moments X0, X1, X2, X3 of the first group are supposed to be $y_{01}, y_{11}, y_{21}, y_{31}$. The sampling values of the second group are $y_{02}, y_{12}, y_{22}, y_{32}$ and the same in the third group and after.

In FIG. 17, average values Y1, Y2, Y3 of y at sampling moments X1, X2, X3 are determined from sampling values in n groups. Specifically, average values Y1, Y2, Y3 are calculated in formulas (11) to (13).

$$Y1 = (y_{11} + y_{12} + y_{13} + \ldots + y_{1n})/n \quad (11)$$

$$Y2 = (y_{01} + y_{02} + y_{03} + \ldots + y_{0n} + \quad (12)$$
$$y_{21} + y_{22} + y_{23} + \ldots + y_{2n})/2n$$

$$Y3 = (y_{31} + y_{32} + y_{33} + \ldots + y_{3n})/n \quad (13)$$

Supposing the inclination of a straight line passing through point (X1, Y1) and point (X3, Y3) to be a, the inclination a is determined in the following formula.

$$a = (Y1 - Y3)/(X1 - X3) \quad (14)$$

Supposing the y segment of a straight line with the inclination a and passing through point (X2, Y2) to be b, this y segment b is determined in formula (15).

$$b = Y2 - a \times X2 \quad (15)$$

Therefore, a straight line parallel to the straight line passing through point (X1, Y1) and point (X3, Y3) and also passing through point (X2, Y2) is expressed in formula (16).

$$y = \{(Y1 - Y3)/(X1 - X3)\} \times x + |Y2 - \{Y1 - Y3)/(X1 - X3)\} \times X2| \quad (16)$$

The deviation amount of x-coordinate of the intersection of the straight line expressed in formula (16) and the straight line of y=(Y1+Y3)/2, and X2 is the stationary shift amount dX at one edge, and this dX is specifically calculated in formula (17). Combining the both edges, the stationary shift amount is 2×dX.

$$dX = X2 - \{(X1 - X3)/(Y1 - Y3)\} \times \{(Y1 + Y3 - 2 \times Y2)/2\} \quad (17)$$

In the above calculation, when simplified by assuming X1=−1, X2=0, X3=1, the inclination a and y segment b are expressed as shown in formula (18).

$$a = (-Y1 + Y3)/2, \ b = Y2 \quad (18)$$

Hence, the formula of the straight line corresponding to formula (16) passing through point (X2, Y2) is expressed as in formula (19), and the stationary shift amount 2×dX is calculated in formula (20).

$$y = \{(-Y1 + Y3)/2\} \times x + Y2 \quad (19)$$
$$2 \times dX = 2 \times \{Y1 + Y3 - 2 \times Y2\}/(-Y1 + Y3)\} \quad (20)$$

In FIG. 16, sampling values sampled in the A/D converter 6 are stored in the shift register 31, average values Y1, Y2, Y3 are calculated in the average value calculator 32 during the open gate in the VFO area, and the stationary shift amount 2×dX is calculated from these average values Y1, Y2, Y3 according to formula (20) in the stationary shift amount calculator 33, and is delivered.

On the basis of the stationary shift amount in the VFO area thus obtained, one expected value compensation table is selected from plural preset expected value compensation tables in the expected value determiner 16. That is, the expected value compensation table is selected so that the compensation amount in the combination of the 2T space length and 2T mark length shown in FIG. 12 may be closest to the measured stationary shift amount.

Incidentally, using the predetermined record pattern in the SYNC area, in certain combinations, when the expected value compensation table is selected so that the shift amount may be closest, the compensation precision of edge shift in the data area described above will be enhanced.

The compensation process of edge shift in the case of reproduction of data area of the optical disk 1 is described below. The pattern (space length and mark length) of data area is recognized in the data pattern recognition unit 15 on the basis of the output from the ACS 12, and the selected expected value compensation table is referred to, and the expected value suited to the recognized pattern is determined in the expected value determiner 16, and is delivered to the branch metric calculator 11. In this way, the compensation of expected value in the data area is executed.

Figure 18:
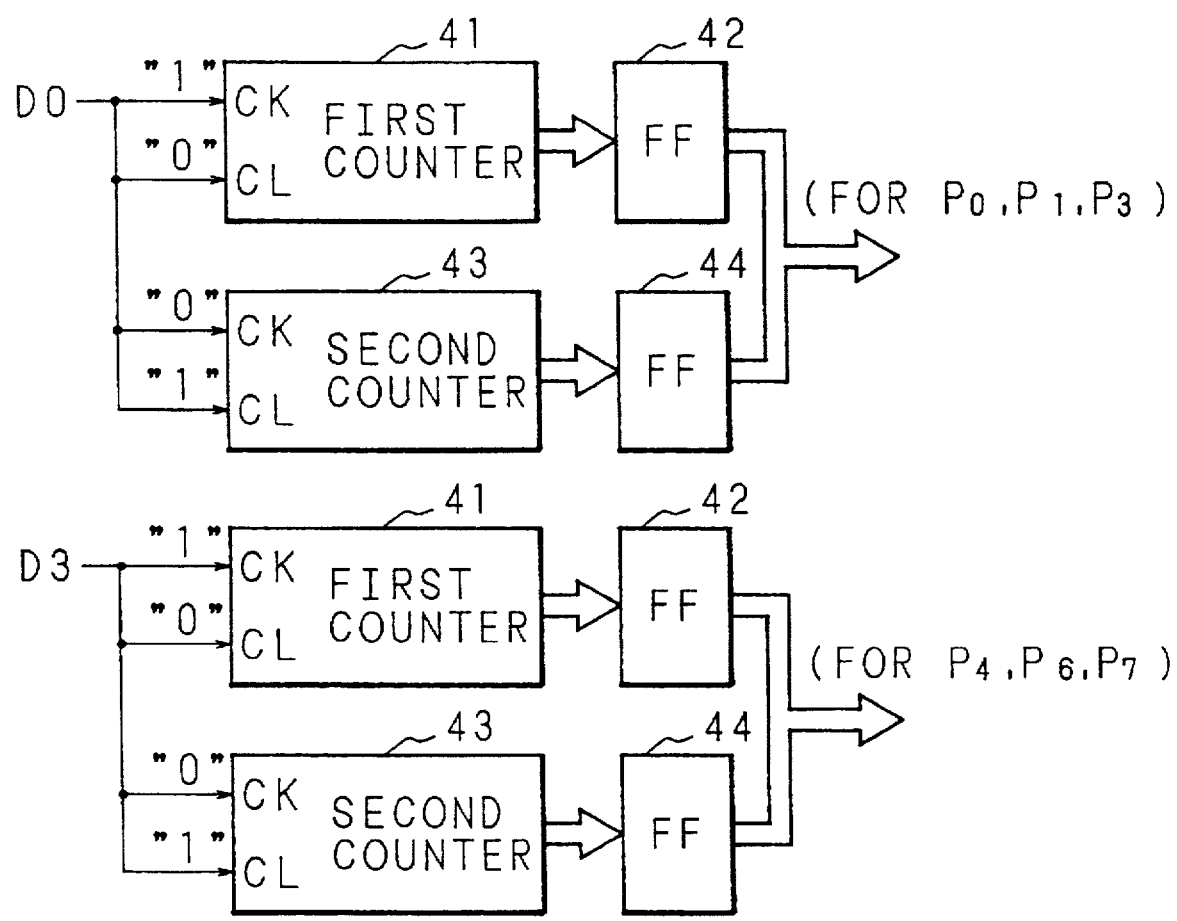
FIG. 18 is an internal block diagram of a data pattern recognition unit.

FIG. 18 is a diagram showing an internal structure of the data pattern recognition unit 15. The data pattern recognition unit 15 has a circuit composed of a first counter 41 for counting "0"s and an FF (flip-flop) 42 connected thereto, and a second counter 43 for counting "1"s and an FF 44 connected thereto, provided by one line in every one of outputs D0, D3 of the ACS 12. The first counter 41 counts "0"s to determine the space length, and the second counter 43 counts "1"s to determine the mark length.

In the outputs D0, D3 from the ACS 12, "0"s and "1"s are counted respectively in the first counter 41 and second counter 42. The space length is judged by counting "0"s, and the mark length, by counting "1"s. According to combinations of space length and mark length, the expected value shown in the selected expected value compensation table is determined, and the determined expected value is used in calculation in the branch metric calculator 11. Expected values $P_0$, $P_1$, $P_3$ are determined on the basis of the output of the line D0, and expected values $P_4$, $P_6$, $P_7$ are determined on the basis of the output of the line D1.

Entire processing of maximum likelihood detection including the edge shift compensation mentioned above may be summarized as follows. First, the reproduction signal in the VFO area of the optical disk 1 is obtained, and its sampling value is inputted to the edge shift measuring instrument 17. In the edge shift measuring instrument 17, the edge shift amount is measured according to the formula (20) in the principle mentioned above. The expected value compensation table is determined in the expected value determiner 16 so that the measured edge shift amount may be closest to the compensation amount in the combination of 2T space length and 2T mark length.

When the data area of the optical disk 1 is read out, the sampling value of the reproduction signal is inputted to the branch metric calculator 11. In the branch metric calculator 11, the branch metric is calculated, and is delivered into the ACS 12. In the ACS 12, the present path metric is determined on the basis of the inputted branch metric and the past path metric read out from the path metric memory 13, and the result is inputted to the path memory 14 and data pattern recognition unit 15. The data (maximum likelihood decoding signal) confirmed from the path memory 14 is outputted to the demodulator 10. In the data pattern recognition unit 15, the pattern of record data is recognized on the basis of the output of the ACS 12, and the result of recognition is outputted to the expected value determiner 16. In the expected value determiner 16, referring to the selected expected value compensation table, the expected value suited to the pattern of the recognized record data is determined, and is delivered to the branch metric calculator 11. This expected value is used in calculation of branch metric.

Figure 19A:
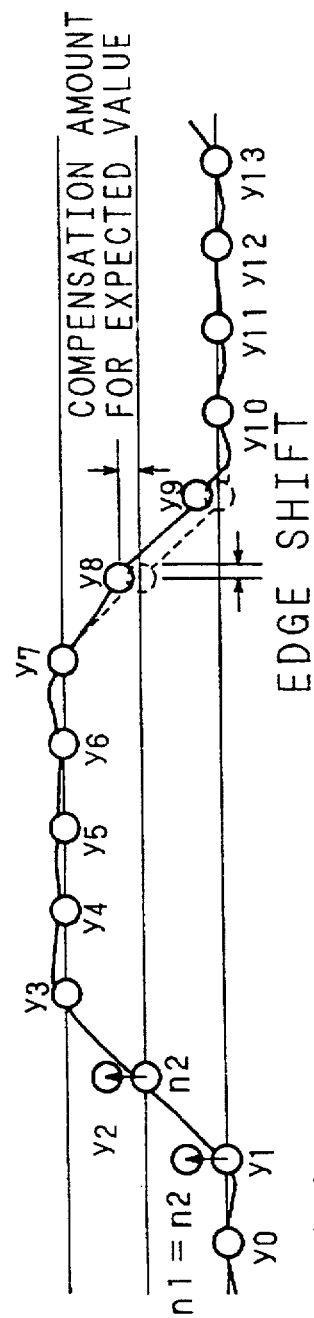
FIGS. 19A and 19B are diagrams showing an example of effect of the invention (without edge shift).
Figure 19B:
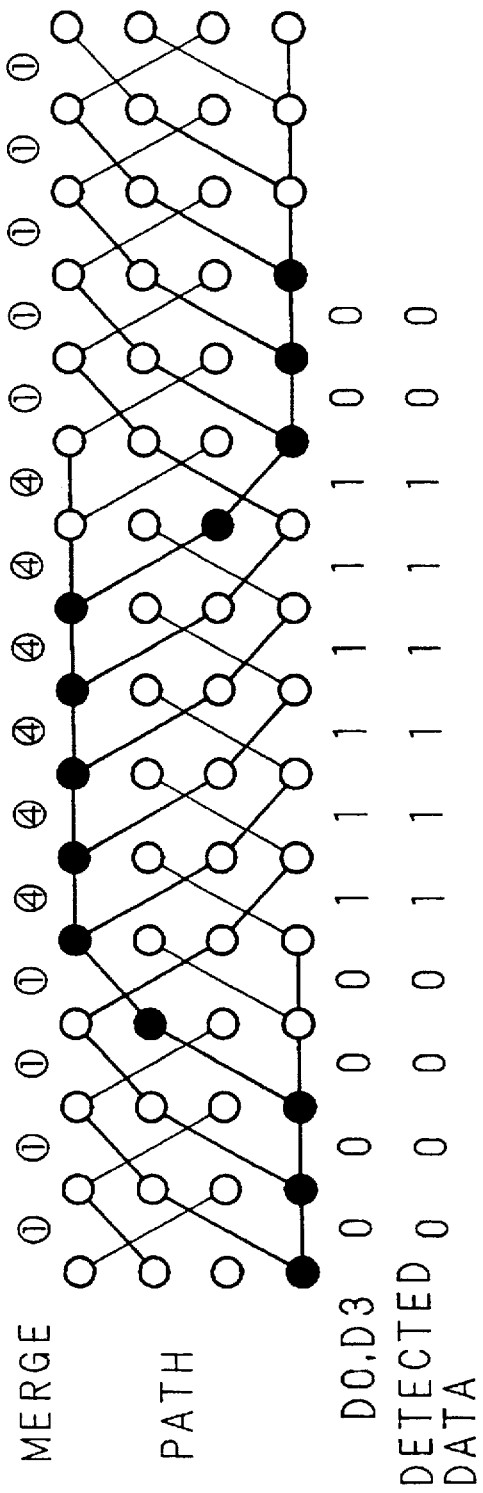

The effects of the invention are described below by referring to FIGS. 19B through 21. FIG. 19 shows correct merge and path without edge shift. FIG. 20B shows merge and path containing edge shift, and FIG. 21B shows merge and path after edge shift compensation according to the invention as mentioned above. Comparing FIGS. 19 and 20, merge is different at t=10, and it is known that detected data is wrong. By contrast, merge at t=10 in FIG. 21 after compensation process of the invention is same as in the case of FIG. 19, and correct detection is known.

Figure 22:
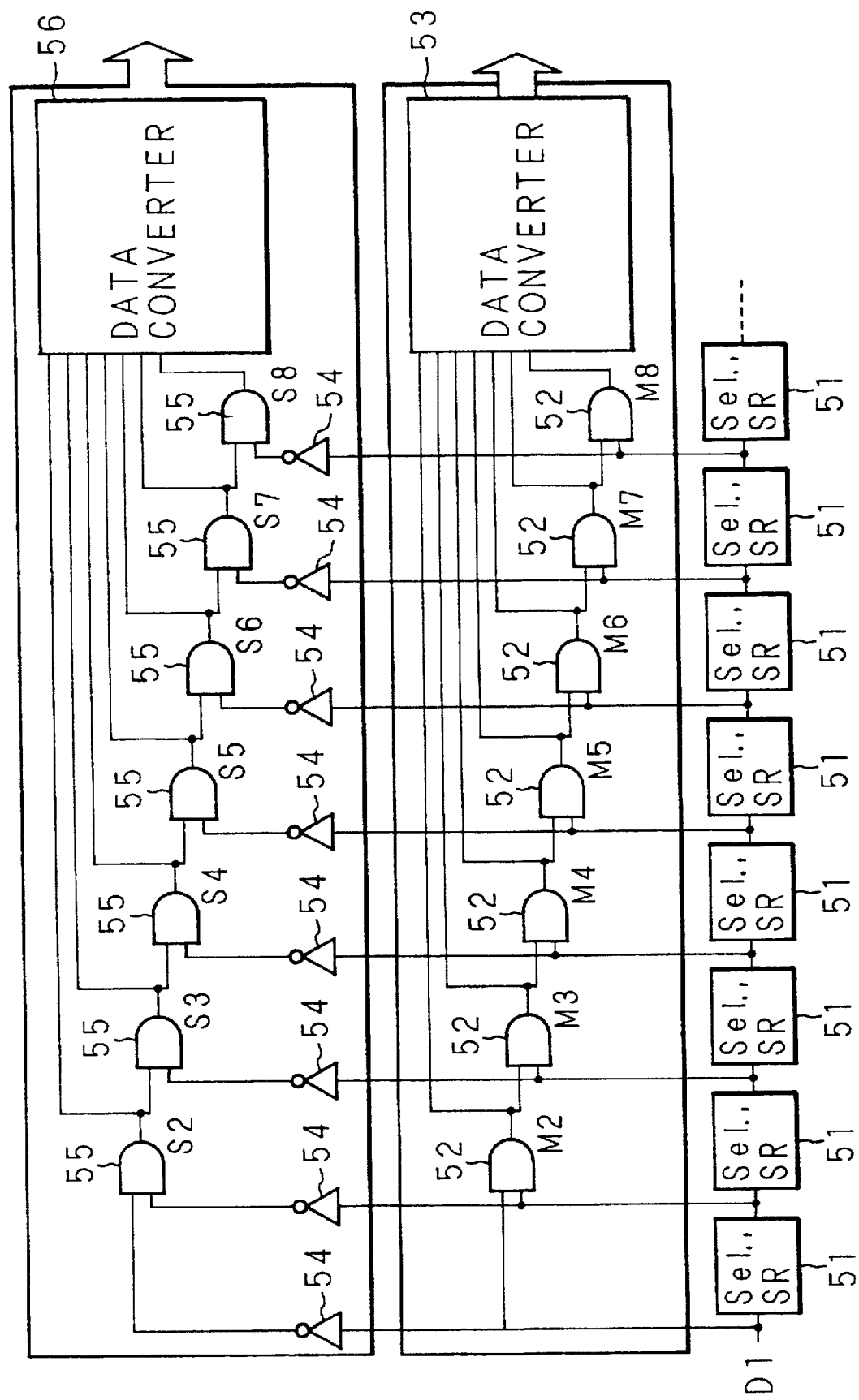
FIG. 22 is a diagram showing other structural example of a data pattern recognition unit.

In the above example, the pattern of the record data in the data area is recognized on the basis of the output from the ACS 12, but it is also possible to recognize the pattern of the record data from the pattern in the path memory 14. FIG. 22 is a schematic diagram showing a constitution of the data pattern recognition unit in such a case. The data pattern recognition unit shown in FIG. 22 has plural stages of selector shift registers (Sel., SR) 51, seven AND units 52, a data converter 53 for summing up output patterns (M2 to M8) of each AND unit 52 into four bits (Z output), eight inverters 54, seven AND units 55, and a data converter 56 for summing up output patterns (S2 to S8) of each AND unit 55 into four bits (Y output).

By correspondence as shown in FIG. 23A according to the data values of outputs M2 to M8 of each AND unit 52, a four-bit Z output is obtained in the data converter 53. When the highest bit of the Z output is "1", a mark is shown. Mark lengths 2T to 8T are classified by the lower three bits. On the other hand, according to the data value of outputs S2 to S8 of each AND unit 55, by the correspondence as shown in FIG. 28B, a four-bit Y output is obtained in the data converter 56. When the highest bit of the Y output is "0", a space is shown. Space lengths 2T to 8T are classified by the lower three bits, same as in the case of the mark length. By determining the mark length and space length in this way, the pattern of record data can be recognized in the path memory 14.

In the shown example, it is designed to select the optimum expected value compensation table, but by preparing plural graphs showing the edge shift values as shown in FIG. 11 in function formulas, and an optimum one may be selected from such function formulas, so that the same effects may be obtained.

Moreover, the shown example is referred to the case of three-value, four-state PR (1, 1) ML, but this is only an example, and the invention may be also applied, of course, in longer restraint length, such as PR (1, 2, 1) ML, PR (1, 2, 2, 1) ML, and PR (1, 3, 3, 1) ML.

Thus, in the invention, relating to the PRML system introduced for higher density, the stationary edge shift and edge shift depending on record pattern can be compensated at the time of reproduction. Moreover, if the PRML system of large restraint length and high detection capacity is introduced, it is not necessary to have two lines for front and rear edges, and it is possible to compose by one line having one A/D converter, and the circuit composition is simple, so that lower cost, smaller size, and smaller power consumption may be realized.

As the invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

We claim:

1. A data reproduction apparatus for reproducing data whose edge position is recorded in an optical disk, comprising:

means for obtaining a reproduction waveform from the optical disk;

a single A/D converter for obtaining a digital value of the obtained reproduction waveform;

means for detecting data by a single maximum likelihood detector in accordance with the converted digital value;

recognizing means for recognizing the pattern of the data recorded in the optical disk; and compensating means for compensating an edge shift according to the recognition result by said recognition means;

wherein said maximum likelihood detector effects a maximum likelihood detection in accordance with an amount of compensation from the edge shift compensating means.

2. A data reproduction apparatus of claim 1, wherein said compensating means includes means for storing plural tables showing values for compensating the edge shift, means for selecting one table from the plural tables on the basis of the digital value of reproduction waveform of predetermined data whose edge position is recorded, and means for compensating edge shift by referring to the selected table.

3. A data reproduction apparatus of claim 2, wherein the plural tables are tables showing compensation amounts of expected values in branch metric calculation of maximum likelihood detection.

4. A data reproduction apparatus of claim 2, wherein said compensating means includes means for compensating for the edge shift by setting an expected value in branch metric calculation of maximum likelihood detection.

5. A data reproduction apparatus of claim 1, wherein said recognizing means includes means for recognizing the pattern of data by using an ACS output of maximum likelihood detection.

6. A data reproduction apparatus of claim 5, wherein said compensating means includes means for compensating for the edge shift by setting an expected value in branch metric calculation of maximum likelihood detection.

7. A data reproduction apparatus of claim 1, wherein said recognizing means includes means for recognizing the pattern of data by using the data in a path memory of maximum likelihood detection.

8. A data reproduction apparatus of claim 7, wherein said compensating means includes means for compensating for the edge shift by setting an expected value in branch metric calculation of maximum likelihood detection.

9. A data reproduction apparatus of claim 1, wherein said compensating means includes means for compensating the edge shift by setting an expected value in branch metric calculation of maximum likelihood detection.

10. A data reproduction method for reproducing data whose edge position is recorded in an optical disk, comprising the steps of:

obtaining a reproduction waveform from the optical disk;

converting the obtained reproduction waveform into a digital value;

detecting data by maximum likelihood detection on the basis of the converted digital value;

recognizing the pattern of the data recorded in the optical disk; and compensating the edge shift according to the recognition result of pattern of data.

11. A data reproduction method of claim 10, wherein the step of compensating the edge shift includes:

a step of selecting one table from plural tables showing values for compensating the edge shift, on the basis of the digital value of reproduction waveform of predetermined data whose edge position is recorded; and a step of compensating the edge shift by referring to the selected table.

12. A data reproduction method of claim 11, wherein the plural tables are tables showing compensation values of expected values in branch metrical calculation of maximum likelihood detection.

13. A data reproduction method of claim 10.

wherein the pattern of data is recognized by using the ACS output of maximum likelihood detection.

14. A data reproduction method of claim 10, wherein the pattern of data is recognized by using the data in the path memory of maximum likelihood detection.

15. A data reproduction method of claim 10, wherein the edge shift is compensated by setting an expected value in branch metric calculation of maximum likelihood detection.

* * * * *